US010257322B2

(12) United States Patent
Lin et al.

(10) Patent No.: US 10,257,322 B2
(45) Date of Patent: Apr. 9, 2019

(54) METHOD FOR ESTABLISHING IN-BAND CONNECTION IN OPENFLOW NETWORK, AND SWITCH

(71) Applicant: Huawei Technologies Co., Ltd., Shenzhen (CN)

(72) Inventors: Ke Lin, Shenzhen (CN); Yongcan Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 349 days.

(21) Appl. No.: 15/095,270

(22) Filed: Apr. 11, 2016

(65) Prior Publication Data
US 2016/0227002 A1 Aug. 4, 2016

Related U.S. Application Data

(63) Continuation of application No. PCT/CN2014/088339, filed on Oct. 11, 2014.

(30) Foreign Application Priority Data

Oct. 18, 2013 (CN) .......................... 2013 1 0493829

(51) Int. Cl.
*H04L 29/06* (2006.01)
*H04L 29/08* (2006.01)

(52) U.S. Cl.
CPC .......... *H04L 69/163* (2013.01); *H04L 67/141* (2013.01)

(58) Field of Classification Search
None
See application file for complete search history.

(56) References Cited

U.S. PATENT DOCUMENTS

2009/0141722 A1* 6/2009 Hall, Jr. ................. H04L 45/00
370/392
2011/0310901 A1* 12/2011 Uchida ................. H04L 43/026
370/392

(Continued)

FOREIGN PATENT DOCUMENTS

CN 103259728 A 8/2013
CN 104579968 A 4/2015
WO 2012101692 A1 8/2012

OTHER PUBLICATIONS

Sharma, S., et al., "Automatic bootstrapping of OpenFlow networks," Workshop on Local & Metropolitan Area Networks (LANMAN), Apr. 10-12, 2013, 6 pages.

(Continued)

*Primary Examiner* — Umar Cheema
*Assistant Examiner* — Anthony T Rotolo
(74) *Attorney, Agent, or Firm* — Conley Rose, P.C.

(57) ABSTRACT

A method for establishing an in-band connection in an OpenFlow network and switch where the method includes receiving, from a first port, a SYN packet passing through a first path, recording the first port as a first transmit port between a target controller and a source switch, according to the SYN packet passing through the first path, in an in-band connection list, and forwarding the SYN packet passing through the first path, receiving a SYN response packet from a second port, determining the first transmit port between the target controller and the source switch, and forwarding the SYN response packet from the first transmit port between the target controller and the source switch which enable controllers and switches provided by more manufacturers are compatible.

20 Claims, 9 Drawing Sheets

(56) References Cited

U.S. PATENT DOCUMENTS

| | | | |
|---|---|---|---|
| 2013/0077481 A1* | 3/2013 | Philavong | H04L 45/38 370/228 |
| 2013/0250797 A1* | 9/2013 | Itoh | H04L 12/56 370/252 |
| 2014/0195666 A1* | 7/2014 | Dumitriu | H04L 12/4625 709/223 |
| 2015/0304216 A1* | 10/2015 | Suzuki | H04L 45/16 370/390 |
| 2016/0080254 A1 | 3/2016 | Zhou et al. | |
| 2016/0241459 A1 | 8/2016 | Zheng et al. | |

OTHER PUBLICATIONS

Foreign Communication From a Counterpart Application, PCT Application No. PCT/CN2014/088339, English Translation of International Search Report dated Jan. 8, 2015, 2 pages.
Foreign Communication From a Counterpart Application, PCT Application No. PCT/CN2014/088339, English Translation of Written Opinion dated Jan. 8, 2015, 7 pages.
Foreign Communication From a Counterpart Application, Chinese Application No. 201310493829.5, Chinese Search Report dated Apr. 6, 2017, 2 pages.
Foreign Communication From a Counterpart Application, Chinese Application No. 201310493829.5, Chinese Office Action dated Apr. 17, 2017, 6 pages.

* cited by examiner

METHOD FOR ESTABLISHING IN-BAND CONNECTION IN OPENFLOW NETWORK, AND SWITCH

CROSS-REFERENCE TO RELATED APPLICATIONS

This application is a continuation of International Application No. PCT/CN2014/088339, filed on Oct. 11, 2014, which claims priority to Chinese Patent Application No. 201310493829.5, filed on Oct. 18, 2013, both of which are hereby incorporated by reference in their entireties.

TECHNICAL FIELD

The present disclosure relates to the field of communications, and in particular, to a method for establishing an in-band connection in an OpenFlow network and switch.

BACKGROUND

In an OpenFlow network, there are two different connection modes between a switch and a controller, that is, an in-band connection mode and an out-of-band connection mode.

In the in-band connection mode, an in-band connection between a controller and a switch may be established in the following manner. That is, when an in-band connection is established between the controller and the switch, an existing protocol needs to be extended, the switch notifies the controller of a network topology using a specific message, and the controller can establish an in-band connection with the switch only after the controller acquires the network topology, and delivers, to an intermediate switch, information about a path used to forward a packet between the controller and the switch. However, in this manner, the existing OpenFlow protocol needs to be extended, and it is difficult for controllers and switches of different manufacturers to be compatible with each other.

SUMMARY

Embodiments of the present disclosure provide a method for establishing an in-band connection in an OpenFlow network and switch, such that controllers and switches provided by more manufacturers are compatible.

According to a first aspect, a method for establishing an in-band connection in an OpenFlow network is provided, including receiving, from a first port, a synchronize sequence number (SYN) packet passing through a first path, where the SYN packet is sent by a source switch to a target controller, recording, the first port as a first transmit port between the target controller and the source switch, according to the SYN packet passing through the first path, in an in-band connection list, and forwarding the SYN packet passing through the first path, receiving, from a second port, a SYN response packet that is sent for the SYN packet by the target controller to the source switch, and forwarding the SYN response packet from the first transmit port, recorded in the in-band connection list, between the target controller and the source switch.

With reference to the first aspect, in a first possible implementation manner of the first aspect, the method further includes recording a first flow entry, where in the first flow entry, a destination address is an address of the source switch, and an egress port is the first transmit port, recorded in the in-band connection list, between the target controller and the source switch.

With reference to the first aspect or the first possible implementation manner of the first aspect, in a second possible implementation manner of the first aspect, the method further includes recording the second port as a second transmit port between the target controller and the source switch, in the in-band connection list.

With reference to the second possible implementation manner of the first aspect, in a third possible implementation manner of the first aspect, the method further includes, when it is determined that no flow entry in which a destination address is an address of the target controller and an egress port is the second port is recorded, recording a second flow entry, where in the second flow entry, a destination address is the address of the target controller, and an egress port is the second transmit port, recorded in the in-band connection list, between the target controller and the source switch.

With reference to the first aspect, or any one of the first or the second possible implementation manner of the first aspect, in a fourth possible implementation manner of the first aspect, forwarding the SYN packet passing through the first path includes, when it is determined that a flow entry in which a destination address is an address of the target controller and an egress port is the second port is recorded, forwarding, from the second port, the SYN packet passing through the first path.

With reference to the first aspect, or any one of the first to the third possible implementation manners of the first aspect, in a fifth possible implementation manner of the first aspect, the forwarding the SYN packet passing through the first path includes, when it is determined that no flow entry in which a destination address is the address of the target controller is recorded, forwarding, from all other ports in a connected state except the first port, the SYN packet passing through the first path.

With reference to the first aspect, or any one of the first to the fifth possible implementation manners of the first aspect, in a sixth possible implementation manner of the first aspect, after the receiving, from a first port, a SYN packet passing through a first path, the method further includes determining that one or more ports of forwarding ports are in a disconnected state, and recording information about the one or more ports in a disconnected state, and information about the SYN packet passing through the first path, and forwarding the SYN packet passing through the first path includes, when a port of the one or more ports is switched from a disconnected state to a connected state, forwarding, from the port switched to a connected state, the SYN packet passing through the first path.

With reference to the first aspect, or any one of the first to the sixth possible implementation manners of the first aspect, in a seventh possible implementation manner of the first aspect, the method further includes recording, a time to live (TTL) value of the SYN packet passing through the first path as the TTL value, in the in-band connection list, corresponding to the first transmit port between the target controller and the source switch, and after recording, the first port as a first transmit port between the target controller and the source switch according to the SYN packet passing through the first path, in an in-band connection list, and forwarding the SYN packet passing through the first path, the method further includes receiving, from a third port, a SYN packet passing through a second path, when a TTL value of the SYN packet passing through the second path is greater than the TTL value recorded in the in-band connection list, corresponding to the first transmit port between the target controller and the source switch, updating the first transmit port between the target controller and the source switch from the first port to the third port, and updating the TTL value recorded in the in-band connection list, corresponding to the first transmit port between the target controller and the source switch to the TTL value of the SYN packet passing through the second path, and discarding the SYN packet passing through the second path, and when the TTL value of the SYN packet passing through the second path is not greater than the TTL value recorded in the in-band connection list, corresponding to the first transmit port between the target controller and the source switch, discarding the SYN packet passing through the second path.

With reference to the first possible implementation manner of the first aspect, in an eighth possible implementation manner of the first aspect, the method further includes, when it is determined that the first transmit port between the target controller and the source switch is disconnected, deleting the first flow entry, or the method further includes receiving a first finish (FIN) packet, where a source address of the first FIN packet is an address of the target controller and a destination address is the address of the source switch, and when it is determined according to the first FIN packet that a packet between another target controller and the source switch does not need to be forwarded according to the first flow entry, deleting the first flow entry.

With reference to the third possible implementation manner of the first aspect, in a ninth possible implementation manner of the first aspect, the method further includes, when it is determined that the second transmit port between the target controller and the source switch is disconnected, deleting the second flow entry, or the method further includes receiving a first FIN packet, where a source address of the first FIN packet is the address of the target controller and a destination address is the address of the source switch, and when it is determined according to the first FIN packet that a packet between the target controller and another source switch does not need to be forwarded according to the second flow entry, deleting the second flow entry.

With reference to the eighth or the ninth possible implementation manner of the first aspect, in a tenth possible implementation manner of the first aspect, the method further includes broadcasting a second FIN packet, where a source address of the second FIN packet is the address of the target controller and a destination address is the address of the source switch.

According to a second aspect, a method for establishing an in-band connection in an OpenFlow network is provided, including broadcasting, by a switch, a SYN packet sent to a target controller, where the SYN packet carries address information of the switch and address information of the target controller, receiving, from a target port, a SYN response packet that is sent for the SYN packet by the target controller, and recording a flow entry, where in the flow entry, an egress port is the target port, and a destination address is an address of the target controller.

With reference to the second aspect, in a first possible implementation manner of the second aspect, the method further includes determining that the target port is switched from a connected state to a disconnected state, and deleting the flow entry.

With reference to the second aspect, in a second possible implementation manner of the second aspect, the method further includes receiving a FIN packet, where a source address of the FIN packet is the address of the target controller and a destination address is an address of the switch, and when it is determined that a packet between another switch and the target controller does not need to be forwarded according to the flow entry, deleting the flow entry.

With reference to the first or the second possible implementation manner of the second aspect, in a third possible implementation manner of the second aspect, the method further includes rebroadcasting the SYN packet.

According to a third aspect, a switch is provided, including a transceiver unit, a recording unit, and a determining unit, where the transceiver unit is configured to receive, from a first port, a SYN packet passing through a first path, where the SYN packet is a packet sent by a source switch to a target controller, forward the SYN packet passing through the first path, receive, from a second port, a SYN response packet that is sent for the SYN packet by the target controller to the source switch, and forward the SYN response packet from a first transmit port, determined by the determining unit, between the target controller and the source switch. The recording unit is configured to record the first port as the first transmit port between the target controller and the source switch according to the SYN packet passing through the first path, in an in-band connection list, and the determining unit is configured to determine the first transmit port between the target controller and the source switch according to the in-band connection list.

With reference to the third aspect, in a first possible implementation manner of the third aspect, the recording unit is further configured to record a first flow entry, where in the first flow entry, a destination address is an address of the source switch, and an egress port is the first transmit port, recorded in the in-band connection list, between the target controller and the source switch.

With reference to the third aspect or the first possible implementation manner of the third aspect, in a second possible implementation manner of the third aspect, the recording unit is further configured to record the second port as a second transmit port between the target controller and the source switch, in the in-band connection list.

With reference to the third aspect, or the first or the second possible implementation manner of the third aspect, in a third possible implementation manner of the third aspect, the determining unit is further configured to determine whether a flow entry in which a destination address is an address of the target controller and an egress port is the second port is recorded. The recording unit is further configured to, when the determining unit determines that no flow entry in which a destination address is the address of the target controller and an egress port is the second port is recorded, record a second flow entry, where in the second flow entry, a destination address is the address of the target controller, and an egress port is the second transmit port, recorded in the in-band connection list, between the target controller and the source switch.

With reference to the third aspect, or any one of the first or the second possible implementation manner of the third aspect, in a fourth possible implementation manner of the third aspect, the determining unit is further configured to determine whether a flow entry in which a destination address is the address of the target controller is recorded. The transceiver unit is further configured to, when the determining unit determines that the flow entry in which the destination address is the address of the target controller is recorded, forward, from the second port, the SYN packet passing through the first path, where an egress port of the flow entry in which the destination address is the address of the target controller is the second port.

With reference to the third aspect, or any one of the first to the third possible implementation manners of the third aspect, in a fifth possible implementation manner of the third aspect, the determining unit is further configured to determine whether the flow entry in which the destination address is the address of the target controller is recorded. The transceiver unit is further configured to forward, from all other ports in a connected state except the first port, the SYN packet passing through the first path when the determining unit determines that no flow entry in which a destination address is the address of the target controller is recorded.

With reference to the third aspect, or any one of the first to the fifth possible implementation manners of the third aspect, in a sixth possible implementation manner of the third aspect, the determining unit is further configured to determine whether a port of forwarding ports is in a disconnected state after the transceiver unit receives, from the first port, the SYN packet passing through the first path. The recording unit is further configured to, when the determining unit determines that one or more ports of the forwarding ports are in a disconnected state, record information about the one or more ports in a disconnected state, and information about the SYN packet passing through the first path. The transceiver unit is further configured to, when a port of the one or more ports is switched from a disconnected state to a connected state, forward, from the port switched to a connected state, the SYN packet passing through the first path.

With reference to the third aspect, or any one of the first to the sixth possible implementation manners of the third aspect, in a seventh possible implementation manner of the third aspect, the recording unit is further configured to record a TTL value of the SYN packet passing through the first path as a TTL value in the in-band connection list, corresponding to the first transmit port between the target controller and the source switch, when the determining unit determines that a TTL value of a SYN packet passing through a second path is greater than the TTL value recorded in the in-band connection list, corresponding to the first transmit port between the target controller and the source switch, update the first transmit port between the target controller and the source switch from the first port to a third port, and update the TTL value recorded in the in-band connection list, corresponding to the first transmit port between the target controller and the source switch to the TTL value of the SYN packet passing through the second path. The transceiver unit is further configured to receive, from the third port, the SYN packet passing through the second path, and discard the SYN packet passing through the second path, and the determining unit is further configured to determine whether the TTL value of the SYN packet passing through the second path is greater than the TTL value recorded in the in-band connection list, corresponding to the first transmit port between the target controller and the source switch.

With reference to the first possible implementation manner of the third aspect, in an eighth possible implementation manner of the third aspect, the switch further includes a first deleting unit configured to, when the determining unit determines that the first transmit port is disconnected or the determining unit determines that a packet between another target controller and the source switch does not need to be forwarded according to the first flow entry, delete the first flow entry. The transceiver unit is further configured to receive a first FIN packet, where a source address of the first FIN packet is an address of the target controller and a destination address is the address of the source switch, and the determining unit is further configured to determine whether the first transmit port is disconnected, or determine according to the first FIN packet whether a packet between another target controller and the source switch needs to be forwarded according to the first flow entry.

With reference to the third possible implementation manner of the third aspect, in a ninth possible implementation manner of the third aspect, the switch further includes a second deleting unit configured to, when the determining unit determines that the second transmit port is disconnected or the determining unit determines that a packet between another target controller and the source switch does not need to be forwarded according to the second flow entry, delete the second flow entry. The transceiver unit is further configured to receive a first FIN packet, where a source address of the first FIN packet is the address of the target controller and a destination address is the address of the source switch, and the determining unit is further configured to determine whether the second transmit port is disconnected, or determine according to the first FIN packet whether a packet between another target controller and the source switch needs to be forwarded according to the second flow entry.

With reference to the eighth or the ninth possible implementation manner of the third aspect, in a tenth possible implementation manner of the third aspect, the transceiver unit is further configured to broadcast a second FIN packet, where a source address of the second FIN packet is the address of the target controller and a destination address is the address of the source switch.

According to a fourth aspect, a switch is provided, including a transceiver unit and a recording unit, where the transceiver unit is configured to broadcast a SYN packet sent to a target controller, where the SYN packet carries address information of the switch and address information of the target controller, and receive, from a target port, a SYN response packet that is sent for the SYN packet by the target controller, and the recording unit is configured to record a flow entry, where in the flow entry, an egress port is the target port, and a destination address is an address of the target controller.

With reference to the fourth aspect, in a first possible implementation manner of the fourth aspect, the switch further includes a first determining unit and a first deleting unit, where the first determining unit is configured to determine that the target port is switched from a connected state to a disconnected state, and the first deleting unit is configured to delete the flow entry.

With reference to the fourth aspect, in a second possible implementation manner of the fourth aspect, the transceiver unit is further configured to receive a FIN packet, where a source address of the FIN packet is the address of the target controller and a destination address is an address of the switch, and the switch further includes a second determining unit and a second deleting unit, where the second determining unit is configured to determine whether a packet between another switch and the target controller needs to be forwarded according to the flow entry. The second deleting unit is configured to, when the second determining unit determines that a packet between another switch and the target controller does not need to be forwarded according to the flow entry, delete the flow entry.

With reference to the first or the second possible implementation manner of the fourth aspect, in a third possible implementation manner of the fourth aspect, the transceiver unit is further configured to rebroadcast the SYN packet.

According to a fifth aspect, a switch is provided, where the switch includes a processor and a memory, where the memory stores program code, and the processor is configured to invoke the program code in the memory, to perform the following operations. Receive, from a first port, a SYN packet passing through a first path, where the SYN packet is sent by a source switch to a target controller, record, the first port as a first transmit port between the target controller and the source switch, according to the SYN packet passing through the first path, in an in-band connection list, and forward the SYN packet passing through the first path, receive, from a second port, a SYN response packet that is sent for the SYN packet by the target controller to the source switch, and forward the SYN response packet from the first transmit port, recorded in the in-band connection list, between the target controller and the source switch.

With reference to the fifth aspect, in a first possible implementation manner of the fifth aspect, the processor is configured to invoke the program code in the memory, to further perform the following operation. Record a first flow entry according to the in-band connection list, where in the first flow entry, a destination address is an address of the source switch, and an egress port is the first transmit port between the target controller and the source switch.

With reference to the fifth aspect or the first possible implementation manner of the fifth aspect, in a second possible implementation manner of the fifth aspect, the processor is configured to invoke the program code in the memory, to further perform the following operation. Record the second port as a second transmit port between the target controller and the source switch, in the in-band connection list.

With reference to the second possible implementation manner of the fifth aspect, in a third possible implementation manner of the fifth aspect, the processor is configured to invoke the program code in the memory, to further perform the following operation when it is determined that no flow entry in which a destination address is an address of the target controller and an egress port is the second port is recorded. Record a second flow entry according to the in-band connection list, where in the second flow entry, a destination address is the address of the target controller, and an egress port is the second transmit port between the target controller and the source switch.

With reference to the fifth aspect, or any one of the first to the third possible implementation manners of the fifth aspect, in a fourth possible implementation manner of the fifth aspect, the processor is configured to invoke the program code in the memory, to perform the following operation when it is determined that a flow entry in which a destination address is the address of the target controller and an egress port is the second port is recorded. Forward, from the second port, the SYN packet passing through the first path.

With reference to the fifth aspect, or any one of the first to the fourth possible implementation manners of the fifth aspect, in a fifth possible implementation manner of the fifth aspect, the processor is configured to invoke the program code in the memory, to perform the following operation when it is determined that no flow entry in which a destination address is the address of the target controller is recorded. Forward, from all other ports in a connected state except the first port, the SYN packet passing through the first path.

With reference to the fifth aspect, or any one of the first to the fifth possible implementation manners of the fifth aspect, in a sixth possible implementation manner of the fifth aspect, after receiving, from a first port, a SYN packet passing through a first path, the processor is configured to invoke the program code in the memory, to perform the following operations. Determine that one or more ports of forwarding ports are in a disconnected state, and record information about the one or more ports in a disconnected state, and information about the SYN packet passing through the first path, and when a port of the one or more ports is switched from a disconnected state to a connected state, forward, from the port switched to a connected state, the SYN packet passing through the first path.

With reference to the fifth aspect, or any one of the first to the sixth possible implementation manners of the fifth aspect, in a seventh possible implementation manner of the fifth aspect, the processor is configured to invoke the program code in the memory, to further perform the following operations. Record, a TTL value of the SYN packet passing through the first path as a TTL value, in the in-band connection list, corresponding to the first transmit port between the target controller and the source switch, and after recording the first port as a first transmit port between the target controller and the source switch, according to the SYN packet passing through the first path, in an in-band connection list, and forward the SYN packet passing through the first path, receive, from a third port, a SYN packet passing through a second path, when a TTL value of the SYN packet passing through the second path is greater than the TTL value recorded in the in-band connection list, corresponding to the first transmit port between the target controller and the source switch, update the first transmit port between the target controller and the source switch from the first port to the third port, update the TTL value recorded in the in-band connection list, corresponding to the first transmit port between the target controller and the source switch to the TTL value of the SYN packet passing through the second path, and discard the SYN packet passing through the second path, and when the TTL value of the SYN packet passing through the second path is not greater than the TTL value recorded in the in-band connection list, corresponding to the first transmit port between the target controller and the source switch, discard the SYN packet passing through the second path.

With reference to the first possible implementation manner of the fifth aspect, in an eighth possible implementation manner of the fifth aspect, the processor is configured to invoke the program code in the memory, to further perform the following operations when it is determined that the first transmit port between the target controller and the source switch is disconnected. Delete the first flow entry, or receive a first FIN packet, where a source address of the first FIN packet is an address of the target controller and a destination address is the address of the source switch, and when it is determined according to the first FIN packet that a packet between another target controller and the source switch does not need to be forwarded according to the first flow entry, delete the first flow entry.

With reference to the third possible implementation manner of the fifth aspect, in a ninth possible implementation manner of the fifth aspect, the processor is configured to invoke the program code in the memory, to further perform the following operations when it is determined that the second transmit port between the target controller and the source switch is disconnected. Delete the second flow entry, or receive a first FIN packet, where a source address of the first FIN packet is the address of the target controller and a destination address is the address of the source switch, and when it is determined according to the first FIN packet that a packet between the target controller and another source switch does not need to be forwarded according to the second flow entry, delete the second flow entry.

With reference to the eighth or the ninth possible implementation manner of the fifth aspect, in a tenth possible implementation manner of the fifth aspect, the processor is configured to invoke the program code in the memory, to further perform the following operation. Broadcast a second FIN packet, where a source address of the second FIN packet is the address of the target controller and a destination address is the address of the source switch.

According to a sixth aspect, a switch is provided, where the switch includes a processor and a memory, where the memory stores program code, and the processor invokes the program code stored in the memory, to perform the following steps Broadcast a SYN packet sent to a target controller, where the SYN packet carries address information of the switch and address information of the target controller, receive, from a target port, a SYN response packet that is sent for the SYN packet by the target controller, and record a flow entry, where in the flow entry, an egress port is the target port, and a destination address is an address of the target controller.

With reference to the sixth aspect, in a first possible implementation manner of the sixth aspect, the processor invokes the program code stored in the memory, to further perform the following steps. Determine that the target port is switched from a connected state to a disconnected state, and delete the flow entry.

With reference to the sixth aspect, in a second possible implementation manner of the sixth aspect, the processor invokes the program code stored in the memory, to further perform the following steps. Receive a FIN packet, where a source address of the FIN packet is the address of the target controller and a destination address is an address of the switch, and when it is determined that a packet between another switch and the target controller does not need to be forwarded according to the flow entry, delete the flow entry.

With reference to the first or the second possible implementation manner of the sixth aspect, in a third possible implementation manner of the sixth aspect, the processor invokes the program code stored in the memory, to further perform the following step. Rebroadcast the SYN packet.

Therefore, in the embodiments of the present disclosure, in a process of establishing an in-band connection between a source switch and a target controller, after receiving, from a first port, a SYN packet that is sent by the source switch and passes through a first path, an intermediate switch uses the first port as a first transmit port between the target controller and the source switch, records the first transmit port in an in-band connection list, and forwards a SYN response packet using the first transmit port recorded in the in-band connection list. Therefore, the intermediate switch can implement, using a maintained in-band connection list, establishment of an in-band connection between the target controller and the source switch, and independently search for a forwarding path of a packet between the source switch and the target controller, and therefore, the existing OpenFlow protocol does not need to be modified, implementation is simple, and compatibility with controllers of more manufacturers can be achieved.

BRIEF DESCRIPTION OF DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
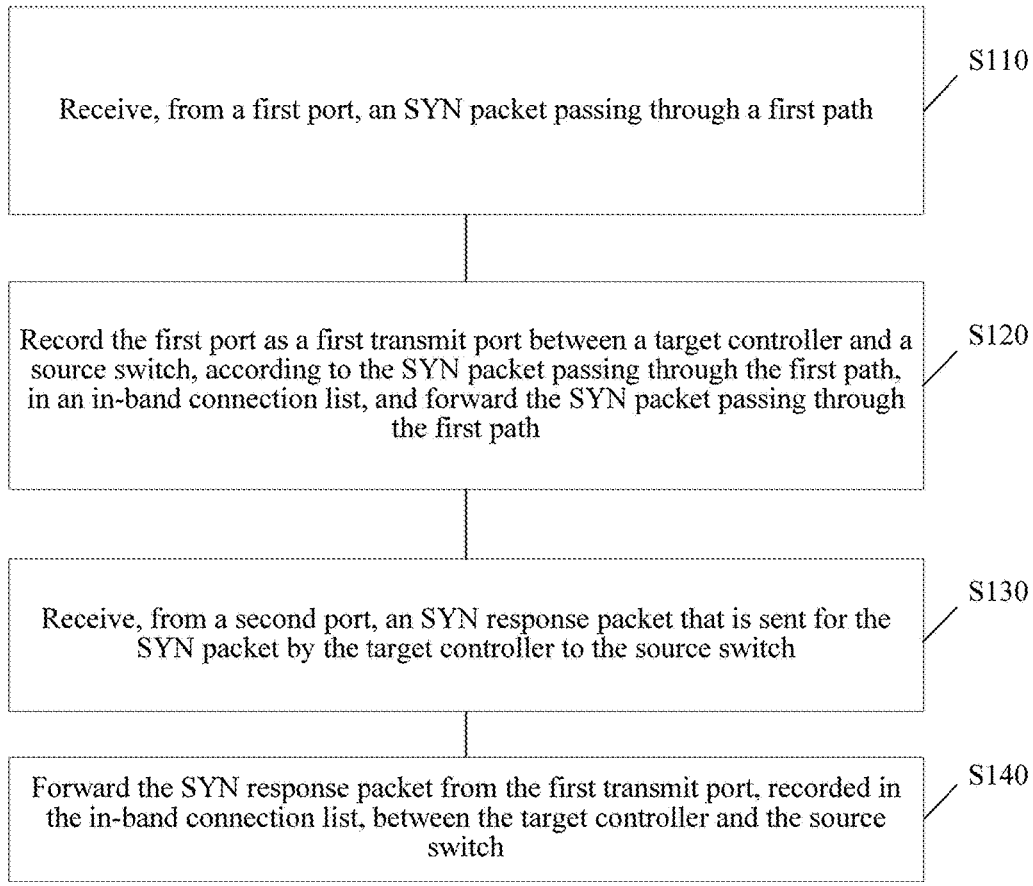
FIG. 1 is a schematic flowchart of a method for establishing an in-band connection in an OpenFlow network according to an embodiment of the present disclosure.

FIG. 1 is a schematic flowchart of a method 100 for establishing an in-band connection in an OpenFlow network according to an embodiment of the present disclosure. As shown in FIG. 1, the method 100 includes the following steps.

Step S110: Receive, from a first port, a SYN packet passing through a first path, where the SYN packet is sent by a source switch to a target controller.

Step S120: Record the first port as a first transmit port between the target controller and the source switch, according to the SYN packet passing through the first path, in an in-band connection list, and forward the SYN packet passing through the first path.

Step S130: Receive, from a second port, a SYN response packet that is sent for the SYN packet by the target controller to the source switch.

Step S140: Forward the SYN response packet from the first transmit port, recorded in the in-band connection list, between the target controller and the source switch.

When an in-band connection needs to be established between a switch (that is, a source switch) and a target controller, the switch may broadcast a SYN packet using all ports in a connected state (up), where the SYN packet carries address information of the source switch and address information of the target controller. After receiving, from the first port, the SYN packet passing through the first path (the SYN packet passing through the first path may be already forwarded by another switch), another switch (that is, an intermediate switch) may record the first port as the first transmit port between the target controller and the source switch, in the in-band connection list, and forward the SYN packet passing through the first path, where the first transmit port recorded in the in-band connection list may be configured to transmit a packet (for example, a SYN response packet sent for a SYN packet) sent by the target controller to the source switch, when receiving, from the second port, a SYN response packet sent for the SYN packet by the target controller, the intermediate switch may determine the first transmit port between the target controller and the source switch according to the in-band connection list, and then forward the SYN response packet from the first transmit port. Then, the SYN response packet is forwarded to the source switch after the SYN response packet may be forwarded by another switch. Optionally, in this embodiment of the present disclosure, the intermediate switch may further record the second port as a second transmit port between the target controller and the source switch, in the in-band connection list, where the second transmit port may be configured to transmit a packet sent by the source switch to the target controller.

Therefore, in this embodiment of the present disclosure, in a process of establishing an in-band connection between a source switch and a target controller, after receiving, from a first port, a SYN packet that is sent by the source switch and passes through a first path, an intermediate switch records the first port as a first transmit port between the target controller and the source switch in an in-band connection list, records a second port, which receives a SYN response packet, as a second transmit port between the target controller and the source switch, in the in-band connection list, and forwards the SYN response packet using the first transmit port recorded in the in-band connection list. Therefore, the intermediate switch can implement, using a maintained in-band connection list, establishment of an in-band connection between the target controller and the source switch, and independently search for a forwarding path of a packet between the source switch and the target controller, and therefore, the existing OpenFlow protocol does not need to be modified, implementation is simple, and compatibility with controllers of more manufacturers can be achieved. In addition, further, establishment of an in-band connection between the source switch and the controller using the maintained in-band connection list is not limited by whether an in-band connection is already established between the intermediate switch and the controller. Therefore, establishment of an in-band connection between the switch and the controller does not need to be implemented from the near to the distant according to distances between switches and controllers.

In this embodiment of the present disclosure, the SYN packet is an in-band connection initial packet, and is used to establish an in-band connection between the source switch and the target controller.

In this embodiment of the present disclosure, the intermediate switch may directly forward, according to information recorded in the established in-band connection list, a packet that is transmitted between the source switch and the target controller after an in-band connection is established between the source switch and the target controller.

Alternatively, in this embodiment of the present disclosure, the intermediate switch may also deliver a first flow entry and/or a second flow entry to forward a packet between the source switch and the target controller, where in the first flow entry, a destination address is an address of the source switch, and an egress port is the first transmit port (which, for example, may be the first port) recorded in the in-band connection list. In the second flow entry, a destination address is an address of the target controller, and an egress port is the second transmit port (which, for example, may be the second port) recorded in the in-band connection list.

In this embodiment of the present disclosure, the intermediate switch may deliver a flow entry to the intermediate switch itself in a manner of simulating the controller and perform recording. In this embodiment of the present disclosure, if the intermediate switch already records a flow entry in which a destination address is the address of the target controller and an egress port is the second port, the intermediate switch may not need to record the flow entry again. When the intermediate switch already records the flow entry in which a destination address is the address of the target controller and an egress port is the second port, it means that an in-band connection is already established between another source switch and the target controller using the intermediate switch, or an in-band connection is already established between the intermediate switch itself and the target controller.

It should be understood that, the first flow entry and the second flow entry in this embodiment of the present disclosure may have only destination addresses and egress ports, or not only may have information about destination addresses and egress ports, but also may have information about source addresses and ingress ports. An address in this embodiment of the present disclosure may be one or more of an Internet Protocol (IP) address, a media access control (MAC) address, and a transmission control protocol (TCP) port number.

In this embodiment of the present disclosure, the forwarding the SYN packet passing through the first path in step S120 may include, when it is determined that a flow entry in which a destination address is an address of the target controller and an egress port is the second port is recorded, forwarding, from the second port, the SYN packet passing through the first path. Alternatively, the forwarding the SYN packet passing through the first path in step S120 includes, when it is determined that no flow entry in which a destination address is the address of the target controller is recorded, forwarding, from all other ports in a connected state (up) except the first port, the SYN packet passing through the first path.

After receiving the SYN packet passing through the first path, the intermediate switch may determine whether the flow entry in which a destination address is an address of the target controller is recorded, and if there is no corresponding flow entry, the intermediate switch may forward the SYN packet from all other ports in a connected state except the first port. If there is a corresponding flow entry, the intermediate switch may determine an egress port (for example, the second port) according to the flow entry, and then forward the SYN packet from the egress port.

It should be understood that, in this embodiment of the present disclosure, an order of executing the steps in the method 100 should not be limited by sequence numbers, and an execution order of processes should be determined according to functions and internal logic of the processes. For example, if the intermediate switch already records a flow entry in which a destination address is the address of the target controller and an egress port is the target controller of the second transmit port between the intermediate switch and the source switch, step S140 may be performed before step S130 is performed. Certainly, step S140 may also be performed after step S150.

After the receiving, from a first port, a SYN packet passing through a first path in step S110, the method 100 may further include determining that one or more ports of forwarding ports are in a disconnected state, and recording information about the one or more ports in a disconnected state, and information about the SYN packet passing through the first path. The forwarding the SYN packet passing through the first path in step S120 includes, when a port of the one or more ports is switched from a disconnected state to a connected state, forwarding, from the port switched to a connected state, the SYN packet passing through the first path.

After receiving, from the first port, the SYN packet passing through the first path, the intermediate switch may determine the forwarding port, for example, a port indicated in an existing flow entry or all other ports in a connected state except the first port. If a port of the forwarding ports is in a disconnected (down) state, the information about the SYN packet passing through the first path may be stored, and after the port is switched from a disconnected state to a connected state, the SYN packet passing through the first path is reconstructed, and then is forwarded from the port.

In this embodiment of the present disclosure, the method 100 may further include recording a TTL value of the SYN packet passing through the first path as a TTL value, in the in-band connection list, corresponding to the first transmit port between the target controller and the source switch, and after recording the first port as a first transmit port between the target controller and the source switch, according to the SYN packet passing through the first path, in an in-band connection list, and forwarding the SYN packet passing through the first path, the method further includes receiving, from a third port, a SYN packet passing through a second path. When a TTL value of the SYN packet passing through the second path is greater than the TTL value recorded in the in-band connection list, corresponding to the first transmit port between the target controller and the source switch, updating the first transmit port between the target controller and the source switch from the first port to the third port, and updating the TTL value recorded in the in-band connection list, corresponding to the first transmit port between the target controller and the source switch to the TTL value of the SYN packet passing through the second path, and discarding the SYN packet passing through the second path, and when the TTL value of the SYN packet passing through the second path is not greater than the TTL value recorded in the in-band connection list, corresponding to the first transmit port between the target controller and the source switch, discarding the SYN packet passing through the second path.

In an OpenFlow network, switches are connected in a complex manner. Therefore, after receiving, from a port, a SYN packet sent by the source switch, the intermediate switch may receive the SYN packet again from another port. In order to minimize a distance between the source switch and the target controller, TTL values of the two received SYN packets may be compared, an ingress port of a SYN packet having a larger TTL value is used as a final first transmit port, and the first transmit port is recorded in the in-band connection list. If the intermediate switch receives a SYN packet from a port for the first time (at this time, no first transmit port between the target controller and the source switch is recorded in the in-band connection list), the port may be written to the in-band connection list as the first transmit port, and a TTL value of the SYN packet received from the port is written to the in-band connection list. If the intermediate switch receives again, from another port, a SYN packet having a same source address and destination address, it may be found through comparison whether a TTL value of the SYN packet received from the other port is greater than the recorded TTL value, if the TTL value is greater than the recorded TTL value, the first transmit port in the in-band connection list may be updated from the port to the other port, and if the TTL value is not greater than the recorded TTL value, the TTL value may be kept unchanged. In addition, in this embodiment of the present disclosure, after receiving a SYN packet each time, the intermediate switch determines whether the in-band connection list includes a record of the SYN packet. If the SYN packet is received for the first time, the SYN packet is forwarded, or if the SYN packet is not received for the first time, the SYN packet is not forwarded. In this way, it can be ensured that a SYN packet of each source switch is forwarded only once, which has an advantage of suppressing a broadcast storm on a loop.

In this embodiment of the present disclosure, the method 100 may further include, when it is determined that the first transmit port between the target controller and the source switch is disconnected, deleting the first flow entry, and when it is determined that the second transmit port between the target controller and the source switch is disconnected, deleting the second flow entry.

Alternatively, in this embodiment of the present disclosure, the method 100 may further include receiving a first FIN packet, where a source address of the first FIN packet is an address of the target controller and a destination address is the address of the source switch. When it is determined according to the first FIN packet that a packet between another target controller and the source switch does not need to be forwarded according to the first flow entry, deleting the first flow entry, and when it is determined according to the first FIN packet that a packet between the target controller and another source switch does not need to be forwarded according to the second flow entry, deleting the second flow entry.

The intermediate switch may monitor a state of each port in real time and if it is monitored that the recorded first transmit port or second transmit port is disconnected, it indicates that a link established between the source switch and the target controller is disconnected. Therefore, the intermediate switch may delete an entry, in which the address information of the target controller and the address information of the source switch are written, in the in-band connection list, and delete a flow entry, which includes information of at least one port, of the first flow entry and the second flow entry. Then, the intermediate switch broadcasts a FIN packet in which a source address is an address of the target controller and a destination address is an address of the source switch, such that other switches forming a link between the source switch and the target controller update the in-band connection list according to the FIN packet and delete a related flow entry.

If another intermediate switch monitors that a port of the link between the source switch and the target controller is disconnected, information related to the port in the in-band connection list may also be deleted, a flow entry related to the port is deleted, and the FIN packet in which a source address is an address of the target controller and a destination address is an address of the source switch is broadcast.

After receiving the FIN packet, the intermediate switch may delete the entry, in which the address information of the target controller and the address information of the source switch are written, in the in-band connection list. When it is determined that a packet between another target controller and the source switch does not need to be forwarded according to the first flow entry, the first flow entry is deleted, where whether a packet between another target controller and the source switch needs to be forwarded according to the first flow entry may be determined according to whether the in-band connection list includes an entry in which both address information of another target controller and the address information of the source switch are written. If the in-band connection list includes the entry, the intermediate switch needs to forward a packet between another target controller and the source switch according to the first flow entry, and if the in-band connection list does not include the entry, the intermediate switch does not need to forward a packet between another target controller and the source switch according to the first flow entry. When it is determined that a packet between the target controller and another source switch does not need to be forwarded according to the second flow entry, the second flow entry is deleted, where whether a packet between the target controller and another source switch needs to be forwarded according to the second flow entry may be determined according to whether the in-band connection list includes an entry in which both the address information of the target controller and address information of another source switch are written. If the in-band connection list includes the entry, the intermediate switch needs to forward a packet between the target controller and another source switch according to the second flow entry, and if the in-band connection list does not include the entry, the intermediate switch does not need to forward a packet between the target controller and another source switch according to the second flow entry. Then, the intermediate switch may further broadcast an FIN packet in which a source address is an address of the target controller and a destination address is an address of the source switch, such that other switches forming a link between the source switch and the target controller update the in-band connection list according to the FIN packet and delete a related flow entry.

Therefore, in this embodiment of the present disclosure, in a process of establishing an in-band connection between a source switch and a target controller, after receiving, from a first port, a SYN packet that is sent by the source switch and passes through a first path, an intermediate switch records the first port as a first transmit port between the target controller and the source switch in an in-band connection list, records a second port, which receives a SYN response packet, as a second transmit port between the target controller and the source switch, in the in-band connection list, and forwards the SYN response packet using the first transmit port recorded in the in-band connection list. Therefore, the intermediate switch can implement, using a maintained in-band connection list, establishment of an in-band connection between the target controller and the source switch, and independently search for a forwarding path of a packet between the source switch and the target controller, and therefore, the existing OpenFlow protocol does not need to be modified, implementation is simple, and compatibility with controllers of more manufacturers can be achieved. In addition, further, establishment of an in-band connection between the source switch and the controller using the maintained in-band connection list is not limited by whether an in-band connection is already established between the intermediate switch and the controller. Therefore, establishment of an in-band connection between the switch and the controller does not need to be implemented from the near to the distant according to distances between switches and controllers.

An information processing method in this embodiment of the present disclosure is described above from a side of an intermediate switch, and a method for establishing an in-band connection in an OpenFlow network in an embodiment of the present disclosure is described below from a side of a source switch.

Figure 2:
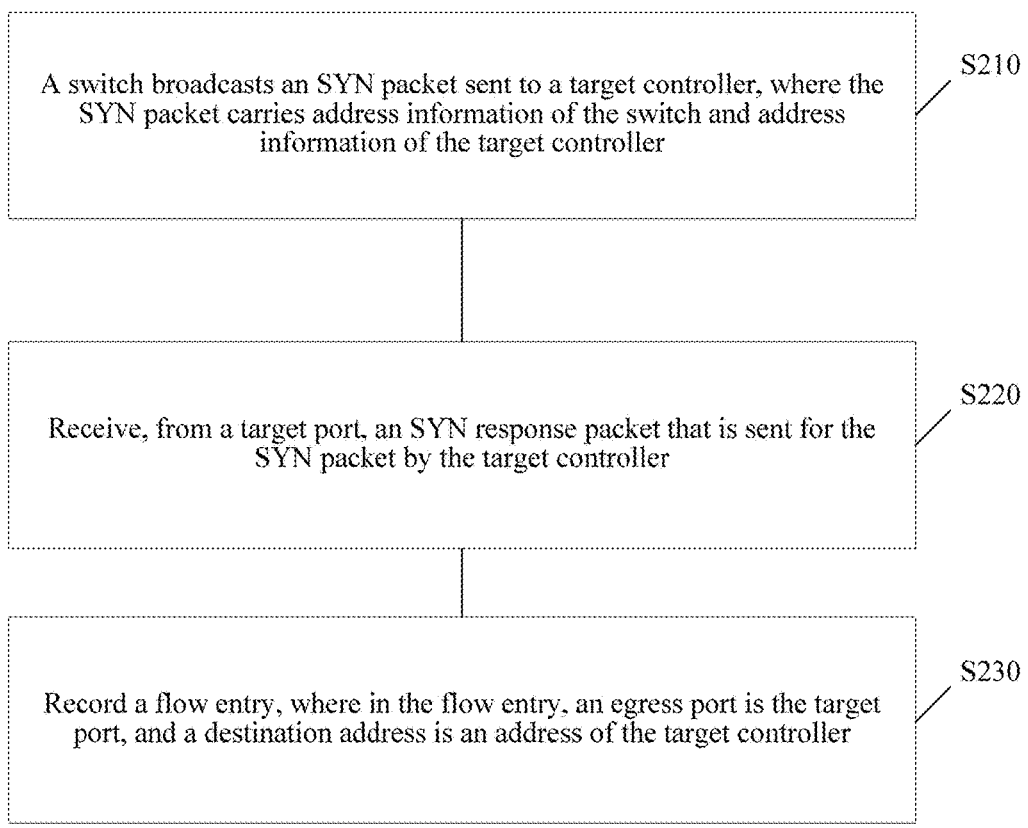
FIG. 2 is a schematic flowchart of a method for establishing an in-band connection in an OpenFlow network according to another embodiment of the present disclosure.

FIG. 2 is a schematic flowchart of a method 200 for establishing an in-band connection in an OpenFlow network according to an embodiment of the present disclosure. As shown in FIG. 2, the method 200 includes the following steps.

Step S210: A switch (that is, the source switch described above) broadcasts a SYN packet sent to a target controller, where the SYN packet carries address information of the switch and address information of the target controller.

Step S220: Receive, from a target port, a SYN response packet that is sent for the SYN packet by the target controller.

Step S230: Record a flow entry, where in the flow entry, an egress port is the target port, and a destination address is an address of the target controller.

When an in-band connection needs to be established between the source switch and the target controller, the source switch may generate a SYN packet in which a source address is an address of the source switch and a destination address is an address of the target controller. Then, may broadcast the SYN packet from all ports in a connected state, and after the source switch receives, from a port (that is, the target port), the SYN response packet that is sent for the SYN packet by the target controller, may record the flow entry, where in the flow entry, the egress port is the target port and the destination address is the address of the target controller. Therefore, when needing to send a packet to the target controller, the source switch may directly send the packet from the target port according to the flow entry.

Therefore, in this embodiment of the present disclosure, after broadcasting the SYN packet, and receiving the SYN response packet from the target port, the source switch establishes the flow entry in which an egress port is the target port, such that the source switch can record the flow entry without depending on the controller, and therefore, the existing OpenFlow protocol does not need to be modified, implementation is simple, and compatibility with controllers of more manufacturers can be achieved.

It should be understood that, in this embodiment of the present disclosure, after receiving the SYN response packet from the target port, the switch may record the target port as a second transmit port between the switch and the target controller in the in-band connection list, where the second transmit port is configured to forward a packet between the switch itself and the target controller, and then record the flow entry according to the in-band connection list. Certainly, the flow entry may also be directly delivered after the SYN response packet is received from the target port. Alternatively, after the in-band connection list is updated, a packet sent to the target controller is directly forwarded according to a record of the in-band connection list, and the flow entry is not delivered.

It should be understood that, in addition to information about a destination address and an egress port, the flow entry may also have information about a source address and an ingress port. An address in this embodiment of the present disclosure may be one or more of an IP address, a MAC address, and a TCP port number.

In this embodiment of the present disclosure, the method 200 may further include determining that the target port is disconnected, and deleting the flow entry.

Alternatively, the method 200 may further include receiving a FIN packet, where a source address of the FIN packet is the address of the target controller and a destination address is an address of the switch, and after it is determined that a packet between another switch and the target controller does not need to be forwarded according to the flow entry, deleting the flow entry.

The source switch may monitor a state of each port in real time, and if it is monitored that the target port is disconnected, it indicates that a link from the source switch towards the target controller is disconnected, and the foregoing flow entry may be deleted. Alternatively, if the source switch receives the FIN packet in which a source address is an address of the target controller and a destination address is an address of the source switch, it indicates that a link from the source switch to the target controller is disconnected, and when it is determined that a packet between another switch and the target controller does not need to be forwarded according to the flow entry, the foregoing flow entry may be deleted. Whether a packet between another switch and the target controller needs to be forwarded according to the flow entry may be determined according to information recorded in the in-band connection list of the source switch.

In this embodiment of the present disclosure, after determining that the link from the source switch to the target controller is disconnected, the source switch may restart to search for a path between the source switch and the target controller, that is, the foregoing SYN packet may be rebroadcast.

Therefore, in this embodiment of the present disclosure, after broadcasting the SYN packet, and receiving the SYN response packet from the target port, the source switch establishes the flow entry in which an egress port is the target port, such that the source switch can establish an in-band connection and record the flow entry without depending on the controller, and therefore, the existing OpenFlow protocol does not need to be modified, implementation is simple, and compatibility with controllers of more manufacturers can be achieved.

In order to understand the present disclosure more clearly, an information processing method in this embodiment of the present disclosure is described below with reference to several scenarios. Before the method for establishing an in-band connection in an OpenFlow network in this embodiment of the present disclosure is described with reference to the several scenarios, in order to understand descriptions of the following scenarios more clearly, the in-band connection list that is mentioned in this embodiment of the present disclosure is described first with reference to Table 1.

In Table 1, there are four entries, and each entry includes information about a target controller, information about a source switch, an egress port, an ingress port, a TTL value, and a path search result. The information about a target controller includes an IP address (Controller IP) of the target controller and a MAC address (Controller MAC) of the target controller, where the MAC address of the controller generally needs to be acquired from a SYN response packet sent by the controller. The information about a source switch includes an IP address (Switch IP) of the source switch, a MAC address (Switch MAC) of the source switch, and a port number (Switch Port) of the source switch. In port is an ingress port (which is the first transmit port described above), and refers to a port, which receives a SYN packet, of an intermediate switch. Out port is an egress port (which is the second transmit port described above). If there is a specific corresponding port under this entry, it indicates that an egress port is already found, and if this entry is marked as none, it indicates that no egress port is found, and the intermediate switch sends the SYN packet using all other ports in a connected state except the ingress port. Already found is used to indicate whether a forwarding path from a source switch to a target controller is found, where true indicates that a forwarding path is found, and false indicates that no forwarding path is found. The TTL value indicates a TTL value of a received SYN packet.

It should be understood that, the in-band connection list shown in Table 1 is only a form of the in-band connection list in the present disclosure, and the in-band connection list in the present disclosure may further be in another form. For example, in Table 1, information about Controller IP, Controller MAC, Already found, and Out port of an entry 1 and an entry 2 (or, an entry 3 and an entry 4) is consistent. Therefore, the information is combined. However, the information may also be separately recorded for the entry 1 and the entry 2. For another example, the information about a controller may further include a port number of the controller.

The information processing method according to this embodiment of the present disclosure is described below with reference to the several scenarios.

Figure 3:
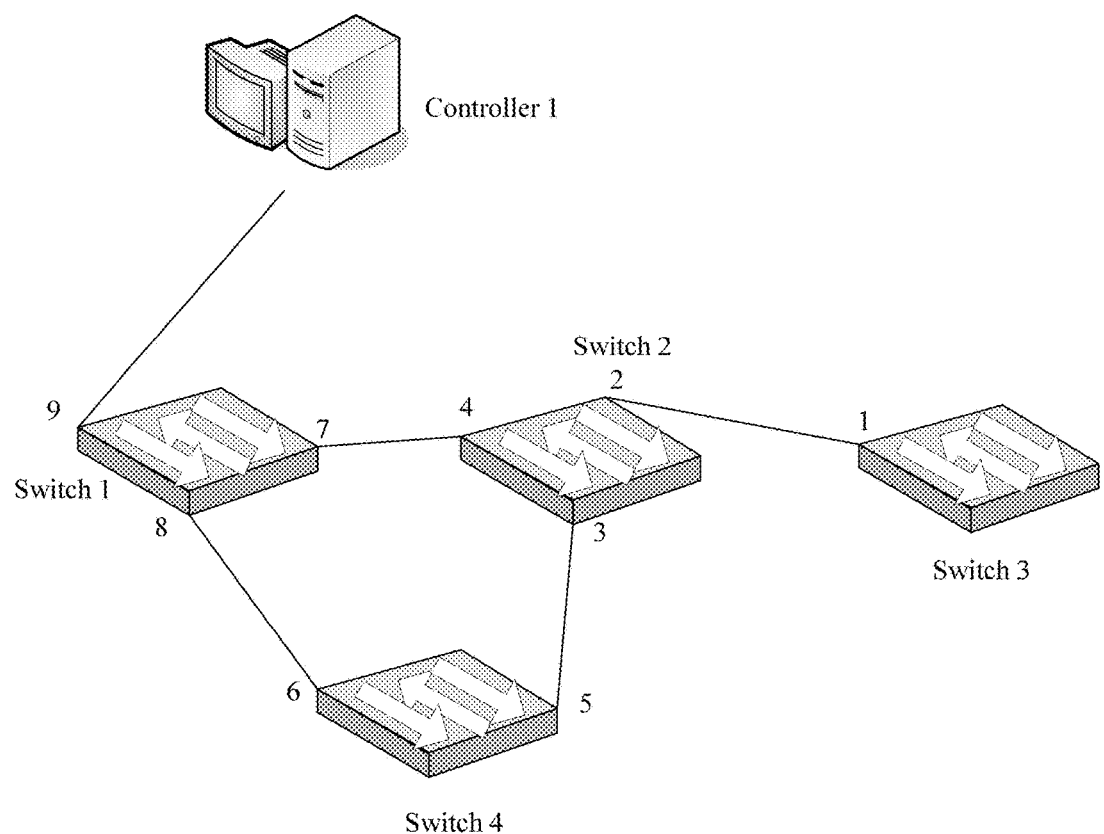
FIG. 3 is a diagram of an application scenario according to another embodiment of the present disclosure.

Scenario 1:

As shown in FIG. 3, in this scenario, connections have not been established between a switch 1, a switch 2, and a switch 4 and a controller 1, and an in-band connection needs to be established between a switch 3 and the controller 1 in an in-band connection mode, and a processing procedure may be shown as follows.

Step 1.1: The switch 3 determines that an in-band connection needs to be established between the switch 3 and the controller 1, and because a forwarding path of a SYN packet is unknown, a SYN packet in the following format may be broadcast using all ports (a port 1) in a connected state:

src_mac:mac3
dst_mac:FF:FF:FF:FF:FF:FF
src_IP:IP3
dst_IP:IP0
ttl:100
src_port:port3
dst_port:6633
A SYN mark is set to 1

TABLE 1

| Controller IP | Controller MAC | Already found | Out port | Switch IP | Switch MAC | Switch Port | In Port | TTL |
|---|---|---|---|---|---|---|---|---|
| 192.168.0.11 | MAC A | true | 4 | IP1 | MAC1 | Port1 | 1 | 99 |
|  |  |  |  | IP2 | MAC2 | Port2 | 3 | 98 |
| 192.168.0.12 | Ff:ff:ff:ff:ff:ff | false | none | IP1 | MAC1 | Port1 | 1 | 99 |
|  |  |  |  | IP2 | MAC2 | Port2 | 3 | 98 |

In the foregoing SYN packet, src_mac:mac3 indicates that a source MAC address of the packet is a MAC address (mac3) of the switch 3, dst_mac:FF:FF:FF:FF:FF:FF dst_mac indicates that a destination MAC address is not acquired yet, src_IP:IP3 indicates that a source address of the packet is an IP address (IP3) of the switch 3, dst_IP:IP0 indicates that a destination address of the packet is an IP address (IP0) of the controller 1, ttl:100 indicates that a TTL value of the packet is 100, src_port:port3 indicates that a source port number of the packet is a port number (port3) of the switch 3, dst_port:6633 indicates that a destination port number of the packet is a port number (6633) of the controller 1, and that a SYN mark is set to 1 indicates that the packet is a SYN packet.

It should be understood that, the foregoing SYN packet is only a specific embodiment of the present disclosure, which should not constitute any limitation to the present disclosure. The SYN packet in this embodiment of the present disclosure may further have another form and other content. For example, a port number indicated by dst_port may be not 6633, and may be another port number, which may be agreed upon by a switch and a controller.

Step 1.2: After receiving, using a port 2, the SYN packet sent by the switch 3, the switch 2 makes a search according to the SYN packet to find whether a flow entry in which a destination address is an address of the controller 1 is stored. If there is no flow entry in which a destination address is an address of the controller 1, because the destination port of the SYN packet is 6633 and the SYN packet is a SYN packet, it is determined that the SYN packet is an in-band connection initial packet sent by the switch 3 whose IP address is IP3 to the controller 1 whose IP address is IP0, the in-band connection list is updated according to the SYN packet, and then, the SYN packet is forwarded from all ports (a port 3 and a port 4) in a connected state other than the port 2. Information about the in-band connection list updated by the switch 2 according to the SYN packet may be shown in Table 2 below.

TABLE 2

| Controller IP | Controller MAC | Already found | Out port | Switch IP | Switch MAC | Switch Port | In Port | TTL |
|---|---|---|---|---|---|---|---|---|
| IP0 | Ff:ff:ff:ff:ff:ff | false | none | IP3 | MAC3 | Port3 | 2 | 99 |

Step 1.3: After receiving, from a port 7, the SYN packet forwarded by the switch 2, the switch 1 updates the in-band connection list according to the SYN packet, and then forwards the SYN packet using a port 8 and a port 9. The in-band connection list updated by the switch 1 according to the SYN packet may be shown in Table 3 below.

TABLE 3

| Controller IP | Controller MAC | Already found | Out port | Switch IP | Switch MAC | Switch Port | In Port | TTL |
|---|---|---|---|---|---|---|---|---|
| IP0 | Ff:ff:ff:ff:ff:ff | false | none | IP3 | MAC3 | Port3 | 7 | 98 |

Step 1.4: After receiving, from a port 5, the SYN packet forwarded by the switch 2, the switch 4 updates the in-band connection list according to the SYN packet, and then forwards the SYN packet using a port 6. The in-band connection list updated by the switch 4 according to the SYN packet may be shown in Table 4 below.

TABLE 4

| Controller IP | Controller MAC | Already found | Out port | Switch IP | Switch MAC | Switch Port | In Port | TTL |
|---|---|---|---|---|---|---|---|---|
| IP0 | Ff:ff:ff:ff:ff:ff | false | none | IP3 | MAC3 | Port3 | 5 | 98 |

Step 1.5: After receiving, from the port 8, the SYN packet forwarded by the switch 4, the switch 1 determines that the in-band connection list already has a record of a same SYN packet, where a TTL value in the record is greater than a TTL value of the newly received SYN packet, and therefore, this SYN packet is not processed.

It should be understood that, if a TTL value of a SYN packet received by a switch again is greater than a TTL value of a SYN packet received last time, and a port receiving the SYN packet again differs from a port receiving the SYN packet last time, In port that is already recorded in the in-band connection list is modified to the port receiving the SYN packet again.

Step 1.6: After receiving the SYN packet forwarded by the switch 1 from the port 9, the controller returns a SYN response packet in the following format from an ingress port:

src_mac:Mac0
dst_mac:mac3
src_IP:IP0
dst_IP:IP3
src_port: a port number specified by a controller, for example, 6633
dst_port:port3
A SYN mark is set to 1
An ACK mark is set to 1

For descriptions of related information about the SYN response packet, reference may be made to the descriptions of the SYN packet in the foregoing, and that an ACK mark is set to 1 indicates that this packet is an acknowledgement (ACK) packet.

Step 1.7: After the switch 1 receives, from the port 9, the SYN response packet that is sent for the SYN packet by the controller 1, the switch 1 compares the SYN response packet with the record in the in-band connection list, finds that the SYN response packet is a reply to the previously received SYN packet, and therefore, updates information about the in-band connection list, as shown in Table 5 below.

TABLE 5

| Controller IP | Controller MAC | Already found | Out port | Switch IP | Switch MAC | Switch Port | In Port | TTL |
|---|---|---|---|---|---|---|---|---|
| IP0 | MAC0 | True | 9 | IP3 | MAC3 | Port3 | 7 | 99 |

Then, the switch 1 determines, according to in port information recorded in the in-band connection list, that sending is performed to the egress port (that is, the port 7) of the switch 3, delivers two flow entries that are shown as follows to the switch 1 itself, and forwards the SYN response packet from the port 7 to the switch 2, where the first flow entry shown below is used to forward a packet sent to the controller 1. The second flow entry is used to forward a packet sent to the switch 3. In the following flow entry, a destination address is recorded in a match field, and a forwarding port is recorded in an action field.

The first flow entry may be shown as follows.

| Flow-mod 1 |
|---|
| command=ADD |
| idle_timeout=0 |
| priority=0 |
| match: |
|     dst_IP=IP0 |
|     dst_tcp=6633 |
| action: |
|     output, port=9 |

The second flow entry may be shown as follows.

| Flow-mod 2 |
|---|
| command=ADD |
| idle_timeout=0 |
| priority=0 |
| match: |
|     dst_IP=IP3 |
|     dst_mac=mac3 |
| action: |
|     output, port=7 |

Step 1.8: Processing after the switch 2 receives the SYN response packet from the port 4 is the same as that performed by the switch 1, that is, the following actions are performed. Updating the in-band connection list, delivering the flow entry, and forwarding the SYN response packet according to the port recorded in the in-band connection list. For details, reference may be made to the descriptions in 1.7, and for brevity, details are not provided herein again.

Step 1.9: After receiving the SYN response packet from the port 1, the switch 3 finds that a destination address of the SYN response packet is the switch 3 itself, and the switch 3 delivers a flow entry shown as follows to the switch 3 itself, where the flow entry is used to forward a packet sent to the controller 1.

| Flow-mod 1 |
|---|
| command=ADD |
| idle_timeout=0 |
| priority=0 |
| match: |
|     dst_IP=IP0 |
|     dst_tcp=6633 |
| action: |
|     output, port=1 |

Therefore, in this embodiment of the present disclosure, after the foregoing processing is performed, each of the switch 1, the switch 2, and the switch 3 stores a flow entry required for forwarding an in-band connection message. In this way, the switch 3 can normally exchange an OpenFlow message with the controller 1, that is, in this embodiment of the present disclosure, a fixed order is not needed in establishing connections between switches and controllers.

Figure 4:
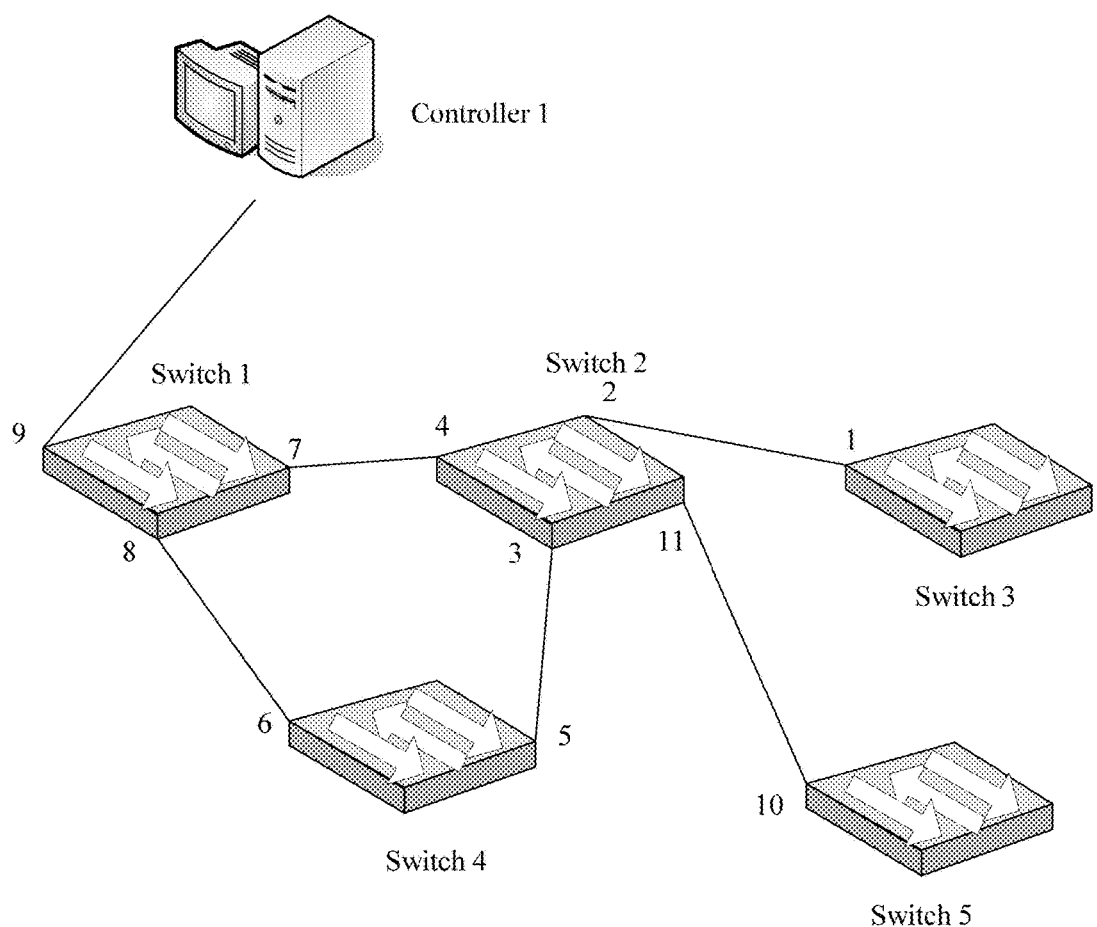
FIG. 4 is a diagram of an application scenario according to another embodiment of the present disclosure.

Scenario 2:

As shown in FIG. 4, after a switch 3 is connected to a controller 1, each of a switch 1, a switch 2, and the switch 3 includes a corresponding forwarding flow entry. If a switch 5 needs to perform capacity expansion to a network in an in-band connection mode, a processing procedure may be as follows.

Step 2.1: The switch 5 determines that an in-band connection needs to be established between the switch 5 and the controller 1, and because there is no flow entry in which a destination address is an address of the controller 1, a SYN packet is broadcast to all ports in a connected state.

Step 2.2: After receiving the SYN packet from a port 11, the switch 2 finds that the SYN packet is an in-band connection initial packet, updates an in-band connection list according to the SYN packet, and forwards the SYN packet using the existing flow entry. An updated in-band connection list is shown in Table 6 below.

TABLE 6

| Controller IP | Controller MAC | Already found | Out port | Switch IP | Switch MAC | Switch Port | In Port | TTL |
|---|---|---|---|---|---|---|---|---|
| IP0 | MAC0 | True | 4 | IP3 | MAC3 | Port3 | 2 | 99 |
|  |  |  |  | IP5 | MAC5 | Port5 | 11 | 99 |

Step 2.3: After receiving the SYN packet from a port 7, the switch 1 finds that the SYN packet is an in-band connection initial packet, updates the in-band connection list according to the SYN packet, and forwards the SYN packet using the existing flow entry. An updated in-band connection list is shown in Table 7 below.

TABLE 7

| Controller IP | Controller MAC | Already found | Out port | Switch IP | Switch MAC | Switch Port | In Port | TTL |
|---|---|---|---|---|---|---|---|---|
| IP0 | MAC0 | True | 9 | IP3 | MAC3 | Port3 | 7 | 98 |
|  |  |  |  | IP5 | MAC5 | Port5 | 7 | 98 |

Step 2.4: After receiving the SYN packet forwarded by the switch 1 from a port 9, the controller returns a SYN response packet in the following format from an ingress port.

Step 2.5: The switch 1 receives, from the port 9, the SYN response packet from the controller 1, and acquires, from the in-band connection list, that an egress port of the switch 5 is a port 7. Because already found in the record is marked as true, the switch 1 delivers a flow entry only to the switch 1 itself, where the flow entry is used to forward a packet sent by the controller to the switch 5, and forwards the SYN response packet from the port 7.

Step 2.6: The switch 2 receives, from a port 4, the SYN response packet from the controller 1, and acquires, from the in-band connection list, that the egress port of the switch 5 is a port 11. Because already found in the record is marked as true, the switch 2 delivers a flow entry only to the switch 2 itself, where the flow entry is used to forward a packet sent by the controller to the switch 5, and forwards the SYN response packet from the port 11.

Step 2.7: After receiving the SYN response packet from the port 1, the switch 5 finds that a destination address of the SYN response packet is the switch 5 itself, and the switch 5 delivers a flow entry to the switch 5 itself, where the flow entry is used to forward a packet sent to the controller 1, a destination address is an address of the controller 1, and an egress port is a port 11.

Therefore, by performing the foregoing steps, the switch 5 may establish an in-band connection with the controller 1 and record a flow entry in which a destination address is an address of the controller 1, and each of the switch 1 and the switch 2 records a flow entry used to forward a packet between the switch 5 and the controller 1. Therefore, the switch 5 can normally exchange an OpenFlow message with the controller 1.

Figure 5:
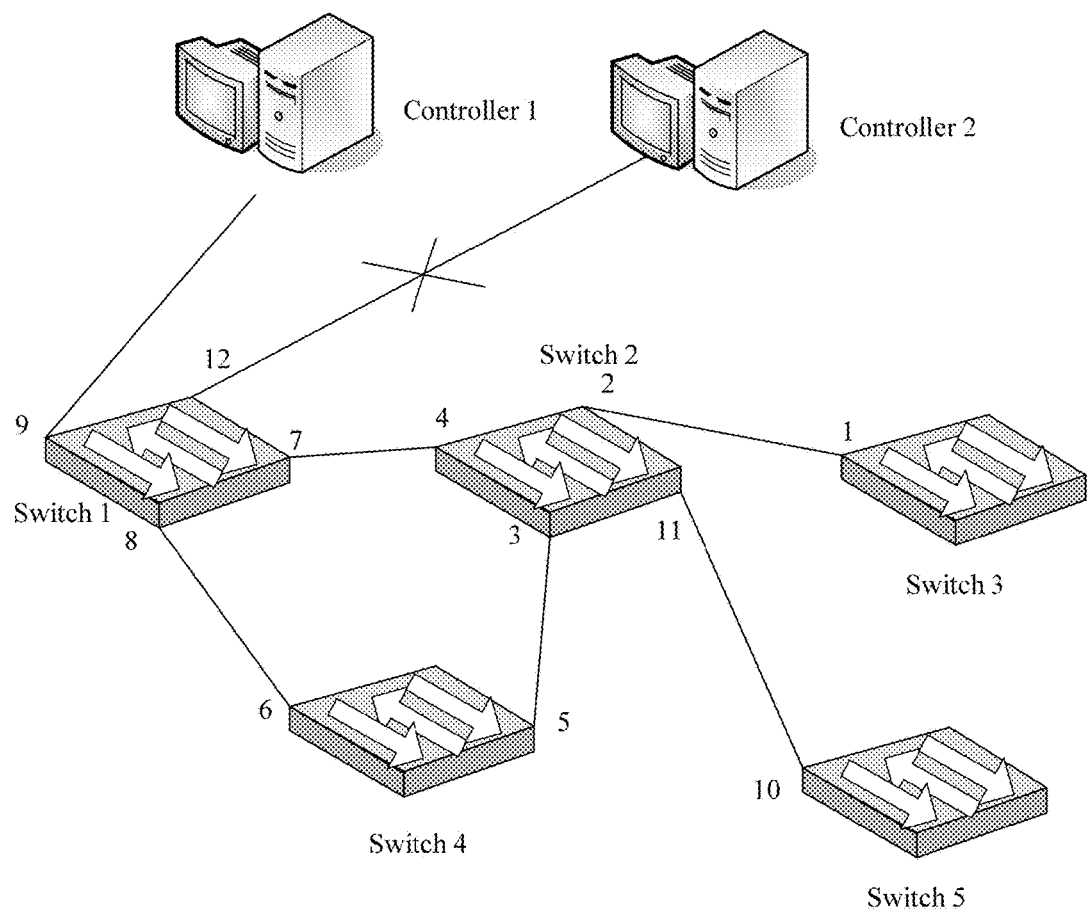
FIG. 5 is a diagram of an application scenario according to another embodiment of the present disclosure.

Scenario 3:

As shown in FIG. 5, there is a link between a switch 1 and a controller 2. However, the link is in a disconnected state.

After establishing an in-band connection with a controller 1, a switch 5 needs to establish an in-band connection with the controller 2 whose IP address is IPA. A corresponding processing procedure is described as follows.

Step 3.1: The switch 5 broadcasts, from all ports (a port 10) in a connected state, a SYN packet sent to the controller 2.

Step 3.2: A switch 2 receives the SYN packet from a port 11, updates an in-band connection list according to the SYN packet, and forwards the SYN packet from all other ports (a port 2, a port 3, and a port 4) in a connected state except an ingress port. An in-band connection list updated by the switch 2 is shown in Table 8 below.

TABLE 8

| Controller IP | Controller MAC | Already found | Out port | Switch IP | Switch MAC | Switch Port | In Port | TTL |
|---|---|---|---|---|---|---|---|---|
| IP0 | MAC0 | True | 4 | IP3 | MAC3 | Port3 | 2 | 99 |
|  |  |  |  | IP5 | MAC5 | Port5 | 11 | 99 |
| IPA | Ff:ff:ff:ff:ff:ff | False | None | IP5 | MAC5 | Port5 | 11 | 99 |

Step 3.3: The switch 1 receives the SYN packet from a port 7, updates the in-band connection list according to the SYN packet, and forwards the SYN packet from all other UP ports (a port 8 and a port 9) except an ingress port. An in-band connection list updated by the switch 1 is shown in Table 9 below

TABLE 9

| Controller IP | Controller MAC | Already found | Out port | Switch IP | Switch MAC | Switch Port | In Port | TTL |
|---|---|---|---|---|---|---|---|---|
| IP0 | MAC0 | True | 9 | IP3 | MAC3 | Port3 | 7 | 98 |
|  |  |  |  | IP5 | MAC5 | Port5 | 7 | 98 |
| IPA | Ff:ff:ff:ff:ff:ff | False | None | IP5 | MAC5 | Port5 | 7 | 98 |

Because a port 12 is in a disconnected state, the switch may record information about the SYN packet, and does not forward information about a port (port 12), such that the SYN packet is forwarded from the port 12 after the port 12 is switched from a disconnected state to a connected state.

Step 3.4: The switch 1 receives the SYN packet from the port 8 again, and because the in-band connection list already has the information about the SYN packet, and a recorded TTL value is greater than a TTL value of the SYN packet that is received again, no processing is performed.

Step 3.5: Because the controller 2 does not receive a SYN packet sent by the switch 5, the controller 2 does not return a SYN response packet. Because the switch 5 does not receive a SYN response packet, the switch 5 may retransmit the SYN packet when a timeout occurs.

Step 3.6: Because the switch 5 retransmits the SYN response packet, both the switch 2 and the switch 1 receive the SYN packet again. Because the in-band connection list already has the information about the SYN packet, and TTL values are the same, no processing is performed.

Therefore, it can be known from the foregoing descriptions that, when the switch cannot be connected to the target controller, the SYN packet may be periodically broadcast. However, another switch forwards the SYN packet only once, which does not cause a broadcast storm on a loop.

Figure 6:
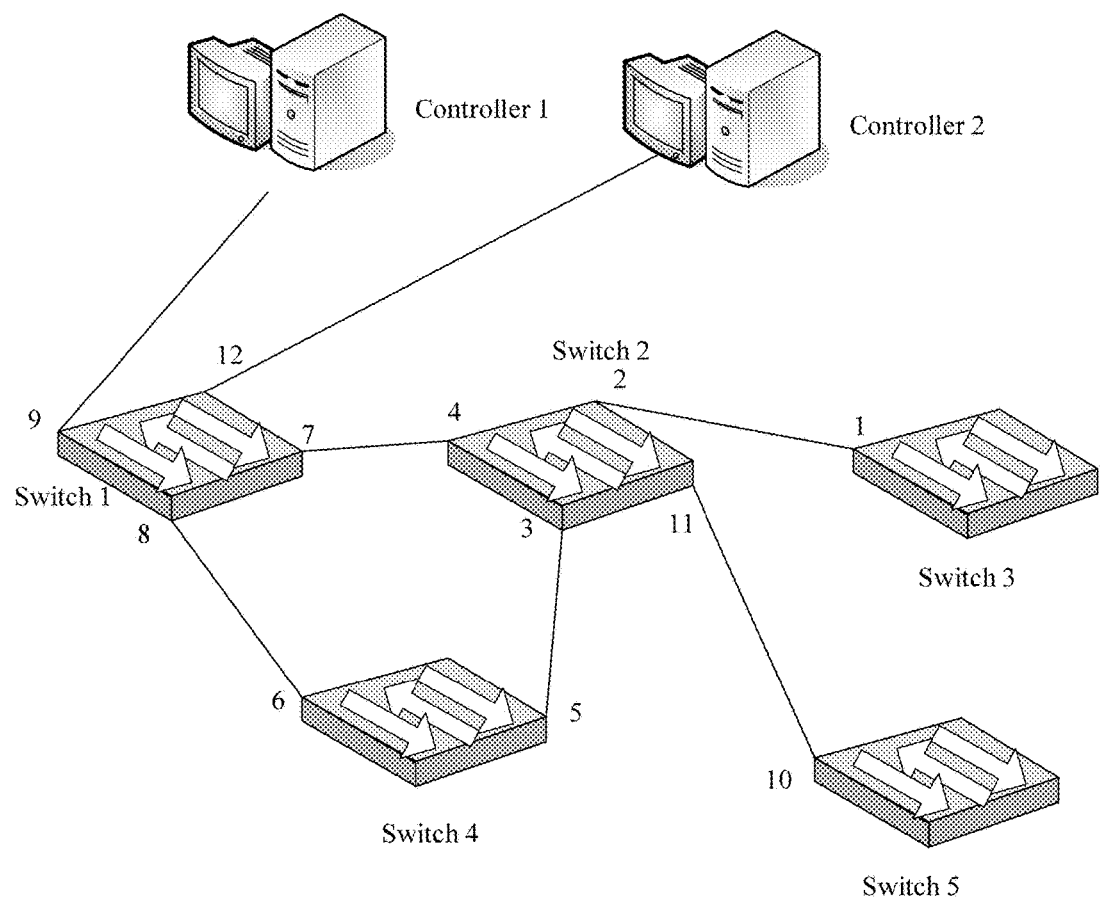
FIG. 6 is a diagram of an application scenario according to another embodiment of the present disclosure.

Scenario 4:

As shown in FIG. 6, in scenario 4, after a link between a switch 1 and a controller 2 is restored to a connected state (that is, a port 12 is switched from a disconnected state to a connected state), it can be known from step 3.3 in scenario 3 that, because a switch 1 does not send, using the port 12, a SYN packet sent by the switch 5, after monitoring that the port 12 is switched to a connected state, the switch resends the SYN packet. A corresponding procedure is described as follows.

Step 4.1: A switch 1 monitors a state of each port. After the port 12 is switched from a disconnected state to a connected state, it is determined that a SYN packet that is not forwarded from the port 12 is recorded, and the SYN packet is reconstructed according to the record.

Step 4.2: After receiving, from the port 12, a SYN response packet returned by the controller 2, the switch 1 updates Table 9 in scenario 3 to Table 10 according to the SYN response packet, delivers a flow entry to the switch 1 itself, where the flow entry is used to forward a SYN packet sent to the controller 2, and finally, forwards the SYN response packet from a port 7.

TABLE 10

| Controller IP | Controller MAC | Already found | Out port | Switch IP | Switch MAC | Switch Port | In Port | TTL |
|---|---|---|---|---|---|---|---|---|
| IP0 | MAC0 | True | 9 | IP3 | MAC3 | Port3 | 7 | 98 |
|  |  |  |  | IP5 | MAC5 | Port5 | 7 | 98 |
| IPA | MACA | True | 12 | IP5 | MAC5 | Port5 | 7 | 98 |

Step 4.3: After a switch 2 receives, from a port 4, the SYN response packet returned by the controller 2, the switch 2 may update an in-band connection list, deliver a flow entry to the switch 2 itself, where the flow entry is used to forward a packet sent to the controller 2, and forward the SYN response packet from a port 11. For specific execution, reference may be made to step 4.2, and for brevity, details are not provided herein again.

Step 4.4: After receiving the SYN response packet from the port 10, the switch 5 finds that a destination address of the packet is the switch 5 itself, and delivers a flow entry to the switch 5 itself, where the flow entry is used to forward a packet sent to the controller 2.

Therefore, in this embodiment of the present disclosure, after being switched from a disconnected state (down) to a connected state (up), a port to which data need to be forwarded may continue to forward a SYN packet that is not forwarded, such that a connection between a switch and a controller can be established in time.

Figure 7:
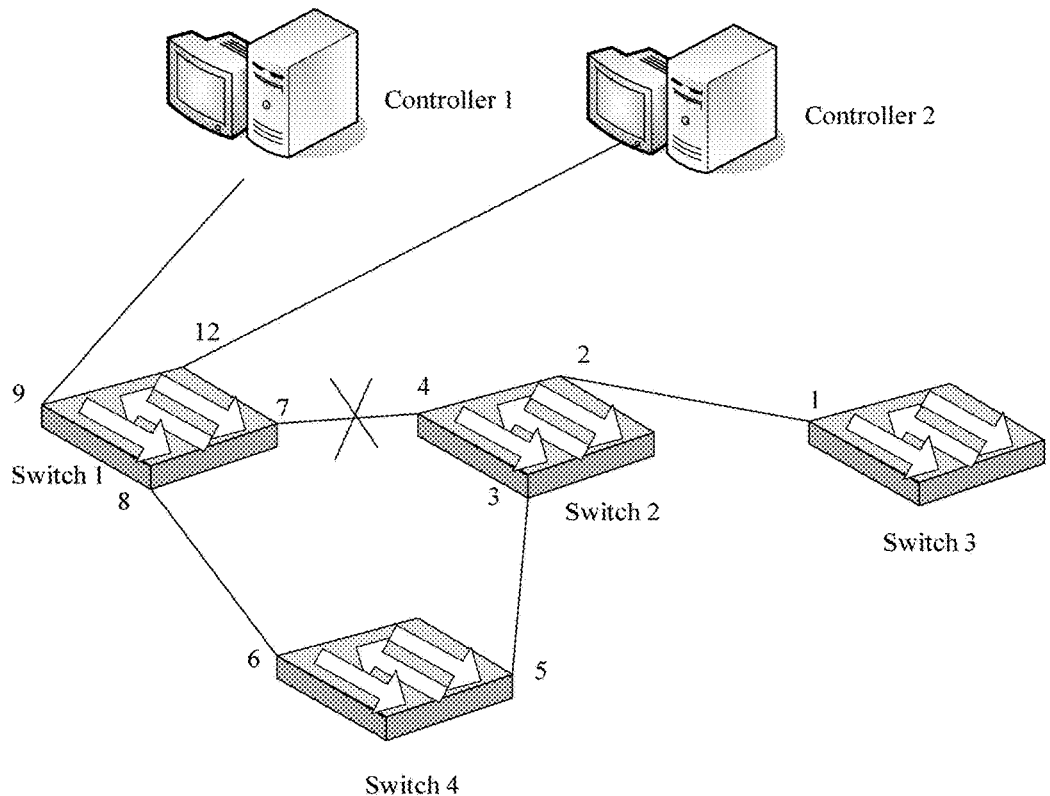
FIG. 7 is a diagram of an application scenario according to another embodiment of the present disclosure.

Scenario 5:

As shown in FIG. 7, in scenario 5, the corresponding procedure in scenario 1 is performed, that is, an in-band connection is already established between the switch 3 and the controller 1. Each switch monitors a disconnection event of each port, and if a disconnected port is a port under in port or out port of a record in the in-band connection list, and already found of the record is marked as true, the disconnected port is a port on a forwarding path. If the disconnected port is not a port on the forwarding path, the switch does not perform any processing on the disconnection event. If the disconnected port is a port on the forwarding path, the switch needs to reestablish a forwarding path. For example, as shown in FIG. 7, a link between a switch 1 and a switch 2 is disconnected, and in order to avoid that the switch 3 cannot transmit information to the controller, the following corresponding procedure may be performed.

Step 5.1: When detecting that a port 7 is disconnected and determining that the port 7 is a port on the forwarding path, the switch 1 deletes an entry, which includes the port 7, in the in-band connection list, then deletes a flow entry related to the port 7, and finally broadcasts a FIN packet in the following format from all ports in a connected state.

Src_mac=mac0
Dst_mac=mac3
Src_IP=IP0
Dst_IP=IP3
Src_port=6633
Dst_port=port3
Tcp_flag=FIN In the foregoing FIN packet, src_mac=mac0 indicates that a source MAC address of the packet is a MAC address (mac0) of the controller 1, Dst_mac=mac3 indicates that a destination MAC address of the packet is a MAC address (mac3) of the switch 3, Src_IP=IP0 indicates that a source IP address of the packet is an IP address (IP0) of the controller 1, Dst_IP=IP3 indicates that a destination IP address of the packet is an IP address (IP0) of the switch 3, Src_port=6633 indicates that a source port number of the packet is a port number (6633) of the controller 1, Dst_port=port3 indicates that a destination port number of the packet is a port number (port3) of the switch 3, and Tcp_flag=FIN indicates that the packet is a FIN packet.

Step 5.2: After detecting that a port 4 is disconnected, the switch 2 repeats processing similar to that performed by the switch 1, and for brevity, details are not provided again.

Step 5.3: A switch 4 receives a FIN packet sent by the switch 1 or the switch 2. Because the FIN packet carries information about the controller 1 and the switch 3, an entry, in which both the information about the controller 1 and the switch 3 are written, in the in-band connection list may be deleted.

Step 5.4: When receiving a FIN packet in the foregoing format or detecting, due to a TCP timeout, that a link is disconnected, the switch 3 restarts to send a SYN packet to search for a new forwarding path. If the in-band connection list in the switch 3 does not include another entry in which address information of the controller 1 and address information of another switch are written, a flow entry in which an egress port is the port 1 and a destination address is an address of the controller 1 may be directly deleted. Otherwise, the flow entry does not need to be deleted.

Therefore, in this embodiment of the present disclosure, when a port on a forwarding path is disconnected, the switch may resend a SYN packet to search for a forwarding path.

Therefore, in this embodiment of the present disclosure, in a process of establishing an in-band connection between a source switch and a target controller, after receiving, from a first port, a SYN packet that is sent by the source switch and passes through a first path, an intermediate switch records the first port as a first transmit port between the target controller and the source switch in an in-band connection list, and forwards a SYN response packet using the first transmit port recorded in the in-band connection list. Therefore, the intermediate switch can implement, using a maintained in-band connection list, establishment of an in-band connection between the target controller and the source switch, and independently search for a forwarding path of a packet between the source switch and the target controller, and therefore, the existing OpenFlow protocol does not need to be modified, implementation is simple, and compatibility with controllers of more manufacturers can be achieved. In addition, further, establishment of an in-band connection between the source switch and the controller using the maintained in-band connection list is not limited by whether an in-band connection is already established between the intermediate switch and the controller. Therefore, establishment of a connection between the switch and the controller does not need to be implemented from the near to the distant according to distances between switches and controllers.

The method for establishing an in-band connection in an OpenFlow network in the embodiments of the present disclosure is described above with reference to FIG. 1, FIG. 2, FIG. 3, FIG. 4, FIG. 5, FIG. 6, and FIG. 7, and a switch for performing the method for establishing an in-band connection in an OpenFlow network in the embodiments of the present disclosure is described below with reference to FIG. 8, FIG. 9, FIG. 10, FIG. 11, FIG. 12, and FIG. 13.

Figure 8:
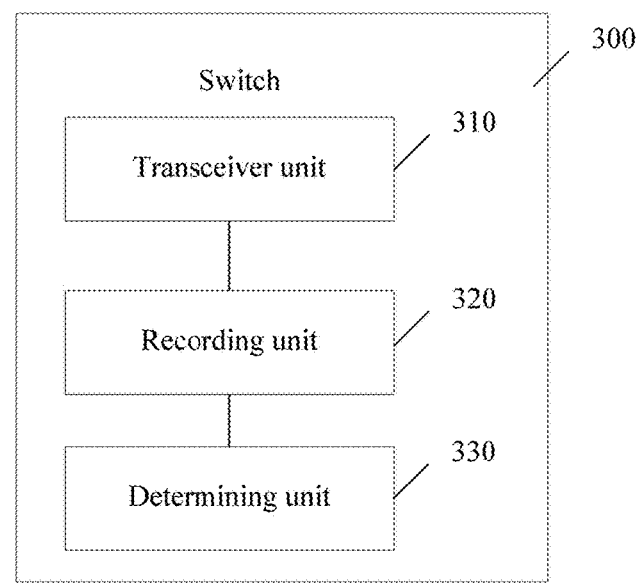
FIG. 8 is a schematic block diagram of a switch according to another embodiment of the present disclosure.

FIG. 8 is a schematic block diagram of a switch 300 according to an embodiment of the present disclosure. As shown in FIG. 8, the switch 300 includes a transceiver unit 310, a recording unit 320, and a determining unit 330, where the transceiver unit 310 is configured to receive, from a first port, a SYN packet passing through a first path, where the SYN packet is a packet sent by a source switch to a target controller, forward the SYN packet passing through the first path, receive, from a second port, a SYN response packet that is sent for the SYN packet by the target controller to the source switch, and forward the SYN response packet from a first transmit port, determined by the determining unit 330, between the target controller and the source switch. The recording unit 320 is configured to record the first port as the first transmit port between the target controller and the source switch, according to the SYN packet passing through the first path, in an in-band connection list, and the determining unit 330 is configured to determine the first transmit port between the target controller and the source switch according to the in-band connection list.

Optionally, the recording unit 320 is further configured to record a first flow entry, where in the first flow entry, a destination address is an address of the source switch, and an egress port is the first transmit port recorded in the in-band connection list.

Optionally, the recording unit 320 is further configured to record the second port as a second transmit port between the target controller and the source switch, in the in-band connection list.

Optionally, the determining unit 330 is further configured to determine whether a flow entry in which a destination address is an address of the target controller is recorded. The recording unit 320 is further configured to, when the determining unit 330 determines that no flow entry in which a destination address is the address of the target controller and an egress port is the second port is recorded, record a second flow entry, where in the second flow entry, a destination address is the address of the target controller, and an egress port is the second transmit port.

Optionally, the determining unit 330 is further configured to determine whether a destination address is an address of the target controller is recorded. The transceiver unit 310 is further configured to, when the determining unit 330 determines that a flow entry in which a destination address is the address of the target controller is recorded, forward, from the second port, the SYN packet passing through the first path, where an egress port of the flow entry in which the destination address is the address of the target controller is the second port.

Optionally, the determining unit 330 is further configured to determine whether a flow entry in which a destination address is an address of the target controller is recorded, and the transceiver unit 310 is further configured to, when the determining unit 330 determines that no flow entry in which a destination address is the address of the target controller is recorded, forward, from all other ports in a connected state except the first port, the SYN packet passing through the first path.

Optionally, the determining unit 330 is further configured to determine whether a port of forwarding ports is in a disconnected state after the transceiver unit 310 receives, from the first port, the SYN packet passing through the first path. The recording unit 320 is further configured to, when the determining unit 330 determines that one or more ports of the forwarding ports are in a disconnected state, record information about the one or more ports in a disconnected state, and information about the SYN packet passing through the first path. The transceiver unit 310 is further configured to, when a port of the one or more ports is switched from a disconnected state to a connected state, forward, from the port switched to a connected state, the SYN packet passing through the first path.

Optionally, the recording unit 320 is further configured to record a TTL value of the SYN packet passing through the first path as a TTL value in the in-band connection list, corresponding to the first transmit port between the target controller and the source switch, when the determining unit 330 determines that a TTL value of a SYN packet passing through a second path is greater than the TTL value recorded in the in-band connection list, corresponding to the first transmit port between the target controller and the source switch, update the first transmit port between the target controller and the source switch from the first port to a third port, and update the TTL value recorded in the in-band connection list, corresponding to the first transmit port between the target controller and the source switch to the TTL value of the SYN packet passing through the second path. The transceiver unit 310 is further configured to receive, from the third port, the SYN packet passing through the second path, and discard the SYN packet passing through the second path, and the determining unit 330 is further configured to determine whether the TTL value of the SYN packet passing through the second path is greater than the TTL value recorded in the in-band connection list, corresponding to the first transmit port between the target controller and the source switch.

Optionally, the switch further includes a first deleting unit 340, where the first deleting unit 340 is configured to delete the first flow entry when the determining unit 330 determines that the first transmit port is disconnected or the determining unit 330 determines that a packet between another target controller and the source switch does not need to be forwarded according to the first flow entry. The transceiver unit 310 is further configured to receive a first FIN packet, where a source address of the first FIN packet is an address of the target controller and a destination address is the address of the source switch, and the determining unit 330 is further configured to determine whether the first transmit port is disconnected, or determine according to the first FIN packet whether a packet between another target controller and the source switch needs to be forwarded according to the first flow entry.

Figure 9:
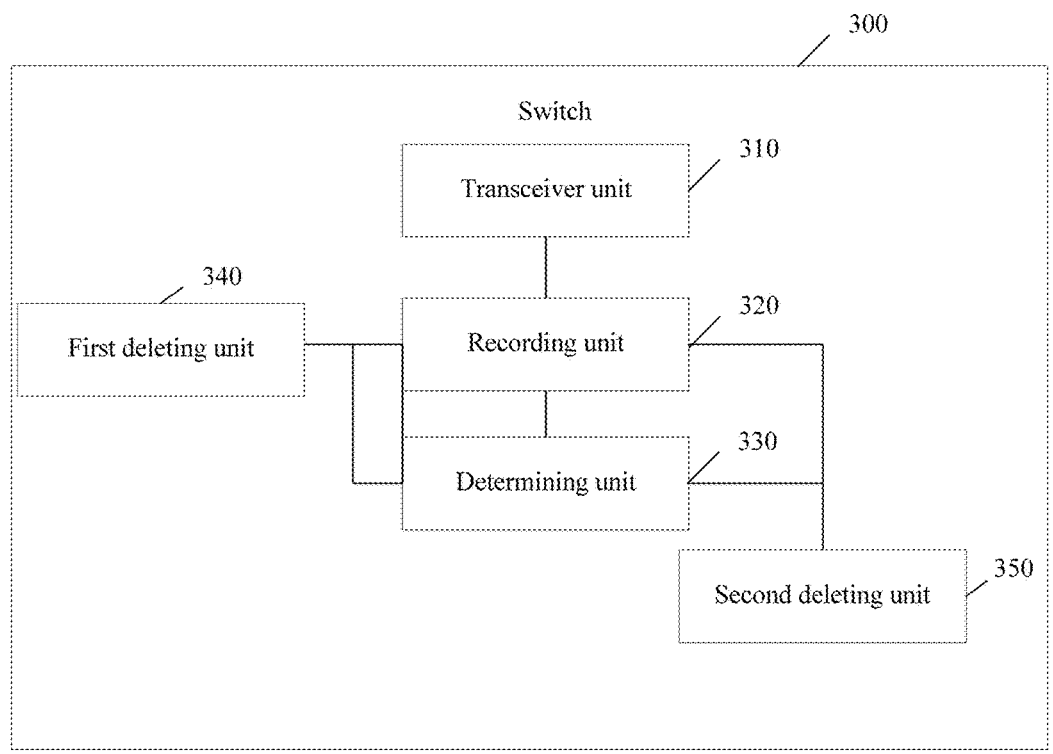
FIG. 9 is a schematic block diagram of a switch according to another embodiment of the present disclosure.

Optionally, as shown in FIG. 9, the switch further includes a second deleting unit 350, where the second deleting unit 350 is configured to delete the second flow entry when the determining unit 330 determines that the second transmit port is disconnected or the determining unit 330 determines that a packet between another target controller and the source switch does not need to be forwarded according to the second flow entry. The transceiver unit 310 is further configured to receive a first FIN packet, where a source address of the first FIN packet is the address of the target controller and a destination address is the address of the source switch, and the determining unit 330 is further configured to determine whether the second transmit port is disconnected, or determine according to the first FIN packet whether a packet between another target controller and the source switch needs to be forwarded according to the second flow entry.

Optionally, the transceiver unit 310 is further configured to broadcast a second FIN packet, where a source address of the second FIN packet is the address of the target controller and a destination address is the address of the source switch.

It should be understood that, the switch 300 in this embodiment of the present disclosure may correspond to the intermediate switch in the method for establishing an in-band connection in an OpenFlow network in the embodiments of the present disclosure, the switch 300 can implement a procedure implemented by the intermediate switch in the method for establishing an in-band connection in an OpenFlow network, and for brevity, details are not provided herein again.

Therefore, in this embodiment of the present disclosure, in a process of establishing an in-band connection between a source switch and a target controller, after receiving, from a first port, a SYN packet that is sent by the source switch and passes through a first path, an intermediate switch records the first port as a first transmit port between the target controller and the source switch in an in-band connection list, records a second port, which receives a SYN response packet, as a second transmit port between the target controller and the source switch, in the in-band connection list, and forwards the SYN response packet using the first transmit port recorded in the in-band connection list. Therefore, the intermediate switch can implement, using a maintained in-band connection list, establishment of an in-band connection between the target controller and the source switch, and independently search for a forwarding path of a packet between the source switch and the target controller, and therefore, the existing OpenFlow protocol does not need to be modified, implementation is simple, and compatibility with controllers of more manufacturers can be achieved. In addition, further, establishment of an in-band connection between the source switch and the controller using the maintained in-band connection list is not limited by whether an in-band connection is already established between the intermediate switch and the controller. Therefore, establishment of a connection between the switch and the controller does not need to be implemented from the near to the distant according to distances between switches and controllers.

Figure 10:
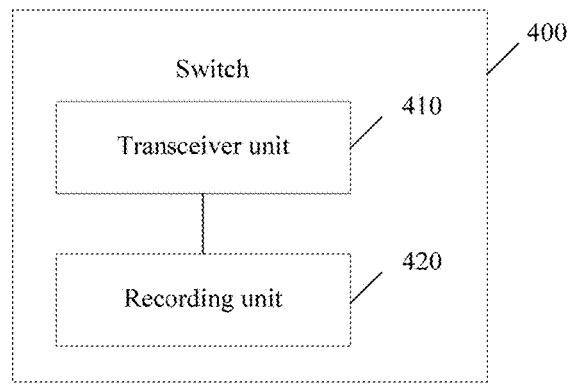
FIG. 10 is a schematic block diagram of a switch according to another embodiment of the present disclosure.

FIG. 10 is a schematic block diagram of a switch 400 according to an embodiment of the present disclosure. As shown in FIG. 10, the switch 400 includes a transceiver unit 410 and a recording unit 420, where the transceiver unit 410 is configured to broadcast a SYN packet sent to a target controller, where the SYN packet carries address information of the switch and address information of the target controller, and receive, from a target port, a SYN response packet that is sent for the SYN packet by the target controller, and the recording unit 420 is configured to record a flow entry, where in the flow entry, an egress port is the target port, and a destination address is an address of the target controller.

Figure 11:
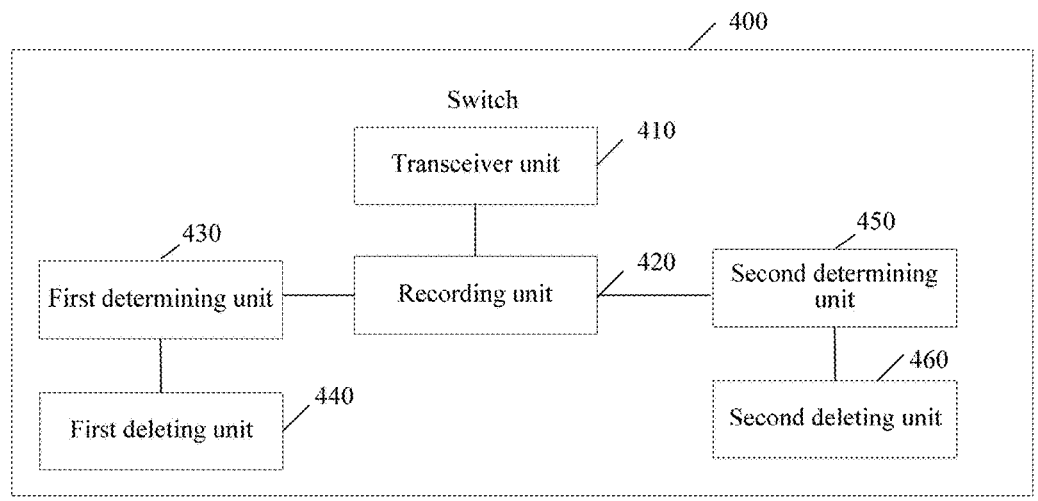
FIG. 11 is a schematic block diagram of a switch according to another embodiment of the present disclosure.

Optionally, as shown in FIG. 11, the switch further includes a first determining unit 430 and a first deleting unit 440, where the first determining unit 430 is configured to determine that the target port is switched from a connected state to a disconnected state, and the first deleting unit is configured to delete the flow entry.

Optionally, the transceiver unit 410 is further configured to receive a FIN packet, where a source address of the FIN packet is the address of the target controller and a destination address is an address of the switch. Correspondingly, as shown in FIG. 11, the switch 400 further includes a second determining unit 450 and a second deleting unit 460, where the second determining unit 450 is configured to determine whether a packet between another switch and the controller needs to be forwarded according to the flow entry, and the second deleting unit 460 is configured to delete the flow entry when the second determining unit 450 determines that a packet between another switch and the controller does not need to be forwarded according to the flow entry.

Optionally, the transceiver unit 410 is further configured to rebroadcast the SYN packet.

It should be understood that, the switch 400 in this embodiment of the present disclosure may correspond to the source switch in the method for establishing an in-band connection in an OpenFlow network in the embodiments of the present disclosure, the switch 400 can implement a procedure implemented by the source switch in the method for establishing an in-band connection in an OpenFlow network, and for brevity, details are not provided herein again.

Therefore, in this embodiment of the present disclosure, after broadcasting a SYN packet, and receiving a SYN response packet from a target port, a source switch establishes a flow entry in which an egress port is the target port, such that the source switch can establish an in-band connection and record the flow entry without depending on a controller, and therefore, the existing OpenFlow protocol does not need to be modified, implementation is simple, and compatibility with controllers of more manufacturers can be achieved.

Figure 12:
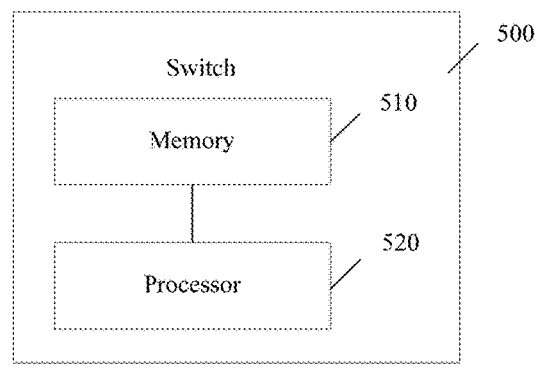
FIG. 12 is a schematic block diagram of a switch according to another embodiment of the present disclosure.

FIG. 12 is a schematic block diagram of a switch 500 according to an embodiment of the present disclosure. As shown in FIG. 12, the switch 500 includes a memory 510 and a processor 520, where the memory 510 stores program code, and the processor is configured to invoke the program code in the memory, to perform the following operations. Receive, from a first port, a SYN packet passing through a first path, where the SYN packet is sent by a source switch to a target controller, Record the first port as a first transmit port between the target controller and the source switch, according to the SYN packet passing through the first path, in an in-band connection list, and forwarding the SYN packet passing through the first path, Receive, from a second port, a SYN response packet that is sent for the SYN packet by the target controller to the source switch, and forward the SYN response packet from the first transmit port, recorded in the in-band connection list, between the target controller and the source switch.

Optionally, the processor 520 is configured to invoke the program code in the memory 510, to further perform the following operation. Record a first flow entry, where in the first flow entry, a destination address is an address of the source switch, and an egress port is the first transmit port, recorded in the in-band connection list, between the target controller and the source switch.

Optionally, the processor 520 is configured to invoke the program code in the memory 510, to further perform the following operation. Record the second port as a second transmit port between the target controller and the source switch, in the in-band connection list.

Optionally, the processor 520 is configured to invoke the program code in the memory 510, to further perform the following operation when it is determined that no flow entry in which a destination address is an address of the target controller and an egress port is the second port is recorded. Record a second flow entry, where in the second flow entry, a destination address is the address of the target controller, and an egress port is the second transmit port, recorded in the in-band connection list, between the target controller and the source switch.

Optionally, the processor 520 is configured to invoke the program code in the memory 510, to perform the following operation when it is determined that a flow entry in which a destination address is an address of the target controller and an egress port is the second port is recorded. Forward, from the second port, the SYN packet passing through the first path.

Optionally, the processor 520 is configured to invoke the program code in the memory 510, to perform the following operation when it is determined that no flow entry in which a destination address is the address of the target controller is recorded. Forward, from all other ports in a connected state except the first port, the SYN packet passing through the first path.

Optionally, after the receiving, from a first port, a SYN packet passing through a first path, the processor 520 is configured to invoke the program code in the memory 510, to perform the following operations. Determine that one or more ports of forwarding ports are in a disconnected state, and record information about the one or more ports in a disconnected state, and information about the SYN packet passing through the first path, and when a port of the one or more ports is switched from a disconnected state to a connected state, forward, from the port switched to a connected state, the SYN packet passing through the first path.

Optionally, the processor 520 is configured to invoke the program code in the memory 510, to further perform the following operations. Record a TTL value of the SYN packet passing through the first path as a TTL value in the in-band connection list, corresponding to the first transmit port between the target controller and the source switch, and after the recording the first port as a first transmit port between the target controller and the source switch, according to the SYN packet passing through the first path, in an in-band connection list, and forwarding the SYN packet passing through the first path, receive, from a third port, a SYN packet passing through a second path, when a TTL value of the SYN packet passing through the second path is greater than the TTL value recorded in the in-band connection list, corresponding to the first transmit port between the target controller and the source switch, update the first transmit port between the target controller and the source switch from the first port to the third port, update the TTL value recorded in the in-band connection list, corresponding to the first transmit port between the target controller and the source switch to the TTL value of the SYN packet passing through the second path, and discard the SYN packet passing through the second path, and when the TTL value of the SYN packet passing through the second path is not greater than the TTL value recorded in the in-band connection list, corresponding to the first transmit port between the target controller and the source switch, discard the SYN packet passing through the second path.

Optionally, the processor 520 is configured to invoke the program code in the memory 510, to further perform the following operations when it is determined that the first transmit port between the target controller and the source switch is disconnected. Delete the first flow entry, or receive a first FIN packet, where a source address of the first FIN packet is an address of the target controller and a destination address is the address of the source switch, and when it is determined according to the first FIN packet that a packet between another target controller and the source switch does not need to be forwarded according to the first flow entry, delete the first flow entry.

Optionally, the processor 520 is configured to invoke the program code in the memory 510, to further perform the following operations when it is determined that the second transmit port between the target controller and the source switch is disconnected. Delete the second flow entry, or receive a first FIN packet, where a source address of the first FIN packet is the address of the target controller and a destination address is the address of the source switch, and when it is determined according to the first FIN packet that a packet between the target controller and another source switch does not need to be forwarded according to the second flow entry, delete the second flow entry.

Optionally, the processor 520 is configured to invoke the program code in the memory 510, to further perform the following operation. Broadcast a second FIN packet, where a source address of the second FIN packet is the address of the target controller and a destination address is the address of the source switch.

It should be understood that, the switch 500 in this embodiment of the present disclosure may correspond to the intermediate switch in the method for establishing an in-band connection in an OpenFlow network in the embodiments of the present disclosure, the switch 500 can implement a process implemented by the intermediate switch in the method for establishing an in-band connection in an OpenFlow network, and for brevity, details are not provided herein again.

Therefore, in this embodiment of the present disclosure, in a process of establishing an in-band connection between a source switch and a target controller, after receiving, from a first port, a SYN packet that is sent by the source switch and passes through a first path, an intermediate switch records the first port as a first transmit port between the target controller and the source switch in an in-band connection list, records a second port, which receives a SYN response packet, as a second transmit port between the target controller and the source switch, in the in-band connection list, and forwards the SYN response packet using the first transmit port recorded in the in-band connection list. Therefore, the intermediate switch can implement, using a maintained in-band connection list, establishment of an in-band connection between the target controller and the source switch, and independently search for a forwarding path of a packet between the source switch and the target controller, and therefore, the existing OpenFlow protocol does not need to be modified, implementation is simple, and compatibility with controllers of more manufacturers can be achieved. In addition, further, establishment of an in-band connection between the source switch and the controller using the maintained in-band connection list is not limited by whether an in-band connection is already established between the intermediate switch and the controller. Therefore, establishment of a connection between the switch and the controller does not need to be implemented from the near to the distant according to distances between switches and controllers.

Figure 13:
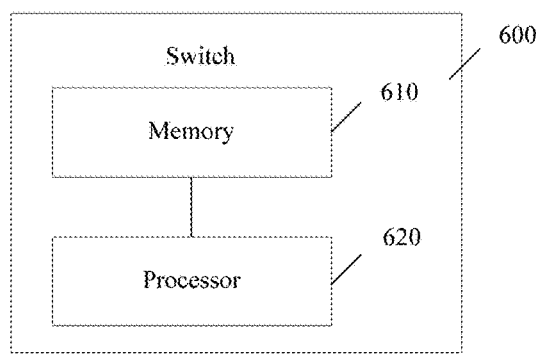
FIG. 13 is a schematic block diagram of a switch according to another embodiment of the present disclosure.

FIG. 13 is a schematic block diagram of a switch 600 according to an embodiment of the present disclosure. As shown in FIG. 13, the switch 600 includes a memory 610 and a processor 620, where the memory 610 stores program code, and the processor 620 invokes the program code stored in the memory 610, to perform the following steps. Broadcast a SYN packet sent to a target controller, where the SYN packet carries address information of the switch and address information of the target controller, and receive, from a target port, a SYN response packet that is sent for the SYN packet by the target controller, and record a flow entry, where in the flow entry, an egress port is the target port, and a destination address is an address of the target controller.

Optionally, the processor 620 invokes the program code stored in the memory 610, to further perform the following steps. Determine that the target port is switched from a connected state to a disconnected state, and delete the flow entry.

Optionally, the processor 620 invokes the program code stored in the memory 610, to further perform the following steps. Receive a FIN packet, where a source address of the FIN packet is the address of the target controller and a destination address is an address of the switch, and after it is determined that a packet between another switch and the controller does not need to be forwarded according to the flow entry, delete the flow entry.

Optionally, the processor 620 invokes the program code stored in the memory 610, to further perform the following step. Rebroadcast the SYN packet.

It should be understood that, the switch 600 in this embodiment of the present disclosure may correspond to the source switch in the method for establishing an in-band connection in an OpenFlow network in the embodiments of the present disclosure, the switch 600 can implement a procedure implemented by the source switch in the method for establishing an in-band connection in an OpenFlow network, and for brevity, details are not provided herein again.

Therefore, in this embodiment of the present disclosure, after broadcasting a SYN packet, and receiving a SYN response packet from a target port, a source switch establishes a flow entry in which an egress port is the target port, such that the source switch can establish an in-band connection and record the flow entry without depending on a controller, and therefore, the existing OpenFlow protocol does not need to be modified, implementation is simple, and compatibility with controllers of more manufacturers can be achieved.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present disclosure.

Methods or steps described in the embodiments disclosed in this specification may be implemented by hardware, a software program executed by a processor, or a combination thereof. The software program may reside in a random access memory (RAM), a memory, a read-only memory (ROM), an electrically programmable ROM, an electrically erasable programmable ROM, a register, a hard disk, a removable disk, a compact-disc read-only memory (CD-ROM), or any other form of storage medium known in the art.

The present disclosure is described in detail with reference to the accompany drawings and in combination with the exemplary embodiments, but the present disclosure is not limited thereto. Various equivalent modifications or replacements can be made to the embodiments of the present disclosure by a person of ordinary skill in the art without departing from the spirit and essence of the present disclosure, and the modifications or replacements shall fall within the scope of the present disclosure.

What is claimed is:

1. A method for establishing an in-band connection in an OpenFlow network, comprising: receiving, from a first port, a synchronize sequence number (SYN) packet going from a source switch to a target controller via a first path; recording, a path search result and the first port as a first transmit port between the target controller and the source switch in an in-band connection list when the SYN packet passes through the first path, the path search result comprising a true value or a false value, the true value indicating that a forwarding path is found, and the false value indicating that no forwarding path is found; forwarding the SYN packet passing through the first path; receiving, from a second port, a SYN response packet corresponding to the SYN packet, the SYN response packet going from the target controller to the source switch; and forwarding the SYN response packet from the first transmit port recorded in the in-band connection list, the in-band connection list being stored in an intermediate switch, the in-band connection list comprising a table, and the table comprising columns for a target controller Internet Protocol (IP) address, a target media access control (MAC) address, an egress port, an IP address of a source switch, a MAC address of the source switch, a port number of the source switch, an ingress port, and a time to live (TTL) value.

2. The method of claim 1, further comprising recording a first flow entry, a destination address of the first flow entry being an address of the source switch, and an egress port of the first flow entry being the first transmit port recorded in the in-band connection list.

3. The method of claim 1, further comprising recording, the second port as a second transmit port between the target controller and the source switch, in the in-band connection list.

4. The method of claim 3, further comprising recording a second flow entry, a destination address of the second flow entry being an address of the target controller, and an egress port of the second flow entry being the second transmit port, recorded in the in-band connection list.

5. The method of claim 1, wherein forwarding the SYN packet passing through the first path comprises forwarding, from the second port, the SYN packet passing through the first path when a flow entry in which a destination address is an address of the target controller and an egress port is the second port recorded.

6. The method of claim 1, wherein forwarding the SYN packet passing through the first path comprises forwarding, from all other ports in a connected state except the first port, the SYN packet passing through the first path.

7. The method of claim 1, further comprising: determining that one or more ports of forwarding ports are in a disconnected state; and recording information about the ports in the disconnected state and information about the SYN packet passing through the first path, wherein forwarding the SYN packet passing through the first path comprises forwarding, from a port switched to a connected state, the SYN packet passing through the first path when the port is switched from the disconnected state to the connected state.

8. The method of claim 1, further comprising: recording, in the in-band connection list, a time to live (TTL) value of the SYN packet traveling along the first path as a TTL value of the first transmit port; receiving, from a third port, the SYN packet traveling along a second path; updating the first transmit port between the target controller and the source switch from the first port to the third port when a TTL value of the SYN packet passing through the second path is greater than the TTL value recorded in the in-band connection list of the first transmit port; updating the TTL value recorded in the in-band connection list of the first transmit port to the TTL value of the SYN packet passing through the second path; and discarding the SYN packet passing through the second path.

9. The method of claim 2, wherein when the first transmit port between the target controller and the source switch is disconnected, the method further comprises: deleting the first flow entry; and broadcasting a second finish (FIN) packet, a source address of the second FIN packet being an address of the target controller, and a destination address being the address of the source switch.

10. The method of claim 2, further comprising: receiving a first finish (FIN) packet, a source address of the first FIN packet being an address of the target controller, and a destination address being the address of the source switch; deleting the first flow entry when according to the first FIN packet that a packet between another target controller and the source switch does not need to be forwarded according to the first flow entry; and broadcasting a second FIN packet, a source address of the second FIN packet being the address of the target controller, and the destination address being the address of the source switch.

11. The method of claim 4, further comprising: deleting the second flow entry when the second transmit port between the target controller and the source switch is disconnected; and broadcasting a second finish (FIN) packet, a source address of the second FIN packet being the address of the target controller, and a destination address being an address of the source switch.

12. The method of claim 4, further comprising: receiving a first finish (FIN) packet, a source address of the first FIN packet being the address of the target controller, and a destination address of the first FIN packet being an address of the source switch; deleting the second flow entry when according to the first FIN packet that a packet between the target controller and another source switch does not need to be forwarded according to the second flow entry; and broadcasting a second FIN packet, a source address of the second FIN packet being the address of the target controller, and a destination address of the second FIN packet being the address of the source switch.

13. A switch, comprising: a memory configured to store a program code; and a processor coupled to the memory and configured to invoke the program code in the memory, to perform the following operations: receive, from a first port, a synchronize sequence number (SYN) packet going from a source switch to a target controller via a first path; record, a path search result and the first port as a first transmit port between the target controller and the source switch in an in-band connection list when the SYN packet passes through the first path, the path search result comprising a true value or a false value, the true value indicating that a forwarding path is found, and the false value indicating that no forwarding path is found; forward the SYN packet passing through the first path; receive, from a second port, a SYN response packet corresponding to the SYN packet, the SYN response packet going from the target controller to the source switch; and forward the SYN response packet from the first transmit port, recorded in the in-band connection list, the in-band connection list being stored in an intermediate switch, the in-band connection list comprising a table, and the table comprising columns for a target controller Internet Protocol (IP) address, a target media access control (MAC) address, an egress port, an IP address of a source switch, a MAC address of the source switch, a port number of the source switch, an ingress port, and a time to live (TTL) value.

14. The switch of claim 13, wherein the processor is configured to invoke the program code in the memory, to further perform an operation of recording a first flow entry, a destination address of the first flow entry being an address of the source switch, and an egress port of the first flow entry being the first transmit port recorded in the in-band connection list.

15. The switch of claim 13, wherein the processor is configured to invoke the program code in the memory, to further perform an operation of recording the second port as a second transmit port between the target controller and the source switch, in the in-band connection list.

16. The switch of claim 15, wherein the processor is configured to invoke the program code in the memory, to further perform an operation of recording a second flow entry, a destination address of the second flow entry being an address of the target controller, and an egress port of the second flow entry being the second transmit port, recorded in the in-band connection list.

17. The switch of claim 13, wherein when forwarding the SYN packet passing through the first path, the processor is configured to invoke the program code in the memory, to further perform the operation forward, from the second port, the SYN packet passing through the first path when a flow entry in which a destination address is an address of the target controller and an egress port is the second port recorded.

18. The switch of claim 13, wherein when forwarding the SYN packet passing through the first path, the processor is configured to invoke the program code in the memory, to further perform the operation forward, from all other ports in a connected state except the first port, the SYN packet passing through the first path.

19. The switch of claim 13, wherein the processor is configured to invoke the program code in the memory, to further perform the following operations: determine that one or more ports of forwarding ports are in a disconnected state; record information about the ports in the disconnected state and information about the SYN packet passing through the first path; and forward, from a port switched to a connected state, the SYN packet passing through the first path when the port is switched from the disconnected state to the connected state.

20. The switch of claim 13, wherein the processor is configured to invoke the program code in the memory, to further perform the following operations: record, in the in-band connection list, a time to live (TTL) value of the SYN packet passing through the first path as a TTL value of the first transmit port; receive, from a third port, the SYN packet passing through a second path; update the first transmit port between the target controller and the source switch from the first port to the third port when a TTL value of the SYN packet passing through the second path is greater than the TTL value recorded in the in-band connection list of the first transmit port; update the TTL value recorded in the in-band connection list of the first transmit port to the TTL value of the SYN packet passing through the second path; and discard the SYN packet passing through the second path.

\* \* \* \* \*